US012539018B2

(12) United States Patent
Nakazato

(10) Patent No.: US 12,539,018 B2
(45) Date of Patent: Feb. 3, 2026

(54) INFORMATION PROCESSING APPARATUS, BRONCHOSCOPE APPARATUS, INFORMATION PROCESSING METHOD, AND PROGRAM

(71) Applicant: FUJIFILM CORPORATION, Tokyo (JP)

(72) Inventor: Takeharu Nakazato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 248 days.

(21) Appl. No.: 18/304,366

(22) Filed: Apr. 21, 2023

(65) Prior Publication Data
US 2023/0363622 A1  Nov. 16, 2023

(30) Foreign Application Priority Data

May 12, 2022  (JP) ................................ 2022-079096

(51) Int. Cl.
*A61B 1/00* (2006.01)
*A61B 1/267* (2006.01)
*G06T 7/62* (2017.01)

(52) U.S. Cl.
CPC ........ *A61B 1/00055* (2013.01); *A61B 1/0005* (2013.01); *A61B 1/2676* (2013.01); *G06T 7/62* (2017.01)

(58) Field of Classification Search
CPC . A61B 1/00055; A61B 1/0005; A61B 1/2676; G06T 7/62
See application file for complete search history.

(56) References Cited

U.S. PATENT DOCUMENTS

| 2005/0020878 A1 | 1/2005 | Ohnishi et al. |
| 2007/0142705 A1 | 6/2007 | Ohnishi et al. |
| 2009/0161927 A1 | 6/2009 | Mori et al. |
| 2009/0292175 A1* | 11/2009 | Akimoto .............. A61B 1/2676 382/128 |
| 2011/0234780 A1 | 9/2011 | Ito et al. |
| 2012/0296620 A1* | 11/2012 | Aulbach ................ A61B 34/10 703/11 |

(Continued)

FOREIGN PATENT DOCUMENTS

| JP | 2004-089483 A | 3/2004 |
| JP | 2018-175379 A | 11/2018 |
| WO | 2004/010857 A1 | 2/2004 |

(Continued)

OTHER PUBLICATIONS

Mori, Masaki et al., "Goals and Problems of CAD by Virtual Bronchoscope", Monthly New Medical Care October Issue, vol. 35, No. 10, vol. 35, Yuan Zhen KON of ME Promotion Association Co., Ltd., Oct. 1, 2008, pp. 110-113.

(Continued)

*Primary Examiner* — Timothy J Neal
(74) *Attorney, Agent, or Firm* — SOLARIS Intellectual Property Group, PLLC

(57) ABSTRACT

An information processing apparatus includes a processor. The processor derives an inner diameter of a bronchus on the basis of volume data including a bronchial image showing the bronchus, and derives an arrival position of a bronchoscope that is inserted into the bronchus on the basis of the inner diameter and an outer diameter of the bronchoscope.

21 Claims, 26 Drawing Sheets

(56) References Cited

U.S. PATENT DOCUMENTS

2020/0078103 A1* 3/2020 Duindam ............... A61B 1/009

FOREIGN PATENT DOCUMENTS

WO     2007/129493 A1    11/2007
WO     2011/102012 A1     8/2011

OTHER PUBLICATIONS

English language translation of the following: Office action dated Dec. 9, 2025 from the JPO in a Japanese patent applicaiton No. 2022-07096 corresponding to the instant patent application. This office action translation is submitted now in order to supplement the understanding of the cited references which are being disclosed in the instant information Disclosure Statement.

* cited by examiner

INFORMATION PROCESSING APPARATUS, BRONCHOSCOPE APPARATUS, INFORMATION PROCESSING METHOD, AND PROGRAM

CROSS-REFERENCE TO RELATED APPLICATIONS

This application claims priority under 35 USC 119 from Japanese Patent Application No. 2022-079096 filed on May 12, 2022, the disclosure of which is incorporated by reference herein.

BACKGROUND

1. Technical Field

The technology of the present disclosure relates to an information processing apparatus, a bronchoscope apparatus, an information processing method, and a program.

2. Related Art

WO2007/129493A discloses a medical image observation support apparatus comprising a volume region setting unit, a luminal organ region information calculation unit, a luminal organ structure information calculation unit, a virtual core line generation unit, a virtual image generation unit, an observation position definition unit, and a display unit.

In the medical image observation support apparatus described in WO2007/129493A, the volume region setting unit sets a volume region including a portion of a luminal organ that extends in a subject on the basis of three-dimensional image data of the subject. The luminal organ region information calculation unit repeatedly calculates luminal region data, which is region information of a specific luminal organ in the volume region, on the basis of three-dimensional image data indicating the luminal organ in the volume region. The luminal organ structure information calculation unit calculates luminal structure data, which is structural information of the luminal organ in the volume region, for each luminal region data item calculated by the luminal organ region information calculation unit. The virtual core line generation unit generates a virtual core line along a longitudinal direction of the luminal organ on the basis of the luminal structure data. The virtual image generation unit generates a virtual image of the luminal organ along the virtual core line. The observation position definition unit defines an observation position for generating the virtual image on the basis of at least one of the virtual core line, the luminal region data, or the luminal structure data such that a luminal organ display region of the display unit has a desired size and moves the observation position along the longitudinal direction of the luminal organ on the basis of the virtual core line or the luminal structure data. The display unit is a unit for displaying the virtual image.

In addition, the medical image observation support apparatus described in WO2007/129493A comprises an endoscope position detection unit and a first actual image observation position estimation unit. The endoscope position detection unit is a unit for detecting a relative position of a distal end part of an endoscope actually inserted into the subject. The first actual image observation position estimation unit compares the position of the distal end part of the endoscope detected by the endoscope position detection unit with the luminal structure data to estimate an actual image observation position which is the position of the distal end part of the endoscope in the luminal organ.

WO2004/010857A discloses an endoscope apparatus comprising a three-dimensional image generation unit, an endoscope, and a navigation image generation unit. In the endoscope apparatus described in WO2004/010857A, the three-dimensional image generation unit generates a three-dimensional image of a body cavity path in a subject on the basis of image data of a three-dimensional region of the subject. The endoscope images the body cavity path in the subject. The navigation image generation unit generates a navigation image consisting of the three-dimensional image and an endoscope image of the body cavity path in the subject captured by the endoscope in order to observe or treat the inside of the subject while guiding an insertion route of the endoscope into the body cavity path in the subject. In addition, the navigation image generation unit adds a reduced image of a three-dimensional image of all of branch points where the body cavity path branches in the subject to the navigation image to generate the navigation image.

SUMMARY

An embodiment according to the technology of the present disclosure provides an information processing apparatus, a bronchoscope apparatus, an information processing method, and a program that can support an operation of inserting a bronchoscope to a predetermined position in a bronchus.

According to a first aspect of the technology of the present disclosure, there is provided an information processing apparatus comprising a processor. The processor derives an inner diameter of a bronchus on the basis of volume data including a bronchial image showing the bronchus, and derives an arrival position of a bronchoscope that is inserted into the bronchus on the basis of the inner diameter and an outer diameter of the bronchoscope.

According to a second aspect of the technology of the present disclosure, in the information processing apparatus according to the first aspect, the arrival position may be a limit position that the bronchoscope is capable of reaching in the bronchus.

According to a third aspect of the technology of the present disclosure, in the information processing apparatus according to the second aspect, the limit position may be a position where the inner diameter is less than the outer diameter, a position where a diameter determined on the basis of the inner diameter is less than the outer diameter, a position where the inner diameter is less than a diameter determined on the basis of the outer diameter, or a position where the diameter determined on the basis of the inner diameter is less than the diameter determined on the basis of the outer diameter.

According to a fourth aspect of the technology of the present disclosure, in the information processing apparatus according to the first aspect or the second aspect, the arrival position may be a position on a shortest pathway to a designated target position in the bronchus.

According to a fifth aspect of the technology of the present disclosure, in the information processing apparatus according to the fourth aspect, a plurality of the target positions may be present, and the arrival position may be derived for each of the target positions.

According to a sixth aspect according to the technology of the present disclosure, in the information processing apparatus according to the fourth aspect or the fifth aspect, the target position may be determined according to an instruction received by a receiving device.

According to a seventh aspect of the technology of the present disclosure, in the information processing apparatus according to any one of the fourth to sixth aspects, the processor may derive a plurality of target position candidates on the basis of the volume data, and the target position may be at least one target position candidate selected from the plurality of target position candidates according to an instruction received by a receiving device.

According to an eighth aspect of the technology of the present disclosure, in the information processing apparatus according to any one of the first to eighth aspects, a plurality of the bronchoscopes may be present, and the arrival position may be derived for each of the bronchoscopes.

According to a ninth aspect of the technology of the present disclosure, in the information processing apparatus according to any one of the first to eighth aspects, a plurality of the bronchoscopes may be present, and the outer diameter may be an outer diameter of a bronchoscope selected from the plurality of bronchoscopes according to an instruction received by a receiving device.

According to a tenth aspect of the technology of the present disclosure, in the information processing apparatus according to any one of the first to ninth aspects, the processor may output arrival position-related information related to the arrival position.

According to an eleventh aspect of the technology of the present disclosure, in the information processing apparatus according to the tenth aspect, the output of the arrival position-related information may be display of the arrival position-related information on a display device.

According to a twelfth aspect of the technology of the present disclosure, in the information processing apparatus according to the tenth aspect or the eleventh aspect, the arrival position-related information may include first alert information for calling attention, and the processor may output the first alert information in a case in which a virtual endoscope corresponding to the bronchoscope reaches the arrival position and/or a position determined on the basis of the arrival position.

According to a thirteenth aspect of the technology of the present disclosure, in the information processing apparatus according to any one of the tenth to twelfth aspects, the processor may display a video image, which is generated on the basis of the volume data and shows an aspect of advancing in the bronchus along a tube, and the arrival position-related information on a display device to be comparable with each other.

According to a fourteenth aspect of the technology of the present disclosure, in the information processing apparatus according to the thirteenth aspect, the video image may include a plurality of images. In a case in which an image showing an aspect of a designated position in the bronchus among the plurality of images is displayed on the display device, the processor may display the arrival position-related information on the display device.

According to a fifteenth aspect of the technology of the present disclosure, in the information processing apparatus according to the fourteenth aspect, the designated position in the bronchus may be a position selected according to an instruction received by a receiving device or a position determined on the basis of the arrival position.

According to a sixteenth aspect of the technology of the present disclosure, in the information processing apparatus according to any one of the thirteenth to fifteenth aspects, the video image may include a plurality of images, and the arrival position-related information may include second alert information for calling attention. In a case in which an image showing an aspect of a designated position in the bronchus among the plurality of images is displayed on the display device, the processor may display the second alert information on the display device.

According to a seventeenth aspect of the technology of the present disclosure, in the information processing apparatus according to any one of the thirteenth to sixteenth aspects, the video image may include a plurality of images, the arrival position-related information may include relationship information indicating a relationship between an image displayed on the display device among the plurality of images and an image showing an aspect of the arrival position, and the processor may display the relationship information corresponding to display content of the video image on the display device.

According to an eighteenth aspect of the technology of the present disclosure, in the information processing apparatus according to any one of the tenth to seventeenth aspects, the arrival position-related information may include support information that supports an operation of the bronchoscope at the arrival position.

According to a nineteenth aspect of the technology of the present disclosure, in the information processing apparatus according to the eighteenth aspect, the support information may include information that is capable of specifying a position of a part having the inner diameter, information indicating precautions in the part, and/or information indicating a treatment method using the bronchoscope.

According to a twentieth aspect of the technology of the present disclosure, in the information processing apparatus according to any one of the first to nineteenth aspects, the outer diameter may be an outer diameter of an insertion portion of the bronchoscope.

According to a twenty-first aspect of the technology of the present disclosure, there is provided a bronchoscope apparatus comprising: the information processing apparatus according to any one of the first to twentieth aspects; and the bronchoscope.

According to a twenty-second aspect of the technology of the present disclosure, there is provided an information processing method comprising: deriving an inner diameter of a bronchus on the basis of volume data including a bronchial image showing the bronchus; and deriving an arrival position of a bronchoscope that is inserted into the bronchus on the basis of the inner diameter and an outer diameter of the bronchoscope.

According to a twenty-third aspect of the technology of the present disclosure, there is provided a program that causes a computer to execute a process comprising: deriving an inner diameter of a bronchus on the basis of volume data including a bronchial image showing the bronchus; and deriving an arrival position of a bronchoscope that is inserted into the bronchus on the basis of the inner diameter and an outer diameter of the bronchoscope.

BRIEF DESCRIPTION OF THE DRAWINGS

Exemplary embodiments of the technology of the disclosure will be described in detail based on the following figures, wherein.

DETAILED DESCRIPTION

Hereinafter, examples of embodiments of an information processing apparatus, a bronchoscope apparatus, an information processing method, and a program according to the technology of the present disclosure will be described with reference to the accompanying drawings.

First, terms used in the following description will be described.

CPU is an abbreviation of "central processing unit". DSP is an abbreviation of "digital signal processor". GPU is an abbreviation of "graphics processing unit". RAM is an abbreviation of "random access memory". NVM is an abbreviation of "non-volatile memory". EEPROM is an abbreviation of "electrically erasable programmable read-only memory". ASIC is an abbreviation of "application specific integrated circuit". PLD is an abbreviation of "programmable logic device". FPGA is an abbreviation of "field-programmable gate array". SoC is an abbreviation of "system-on-a-chip". SSD is an abbreviation of "solid state drive". USB is an abbreviation of "universal serial bus". HDD is an abbreviation of "hard disk drive". EL is an abbreviation of "electro-luminescence". CMOS is an abbreviation of "complementary metal oxide semiconductor". CCD is an abbreviation of "charge coupled device". CT is an abbreviation of "computed tomography". MRI is an abbreviation of "magnetic resonance imaging". PC is an abbreviation of "personal computer". LAN is an abbreviation of "local area network". WAN is an abbreviation of "wide area network". AI is an abbreviation of "artificial intelligence".

Figure 1:
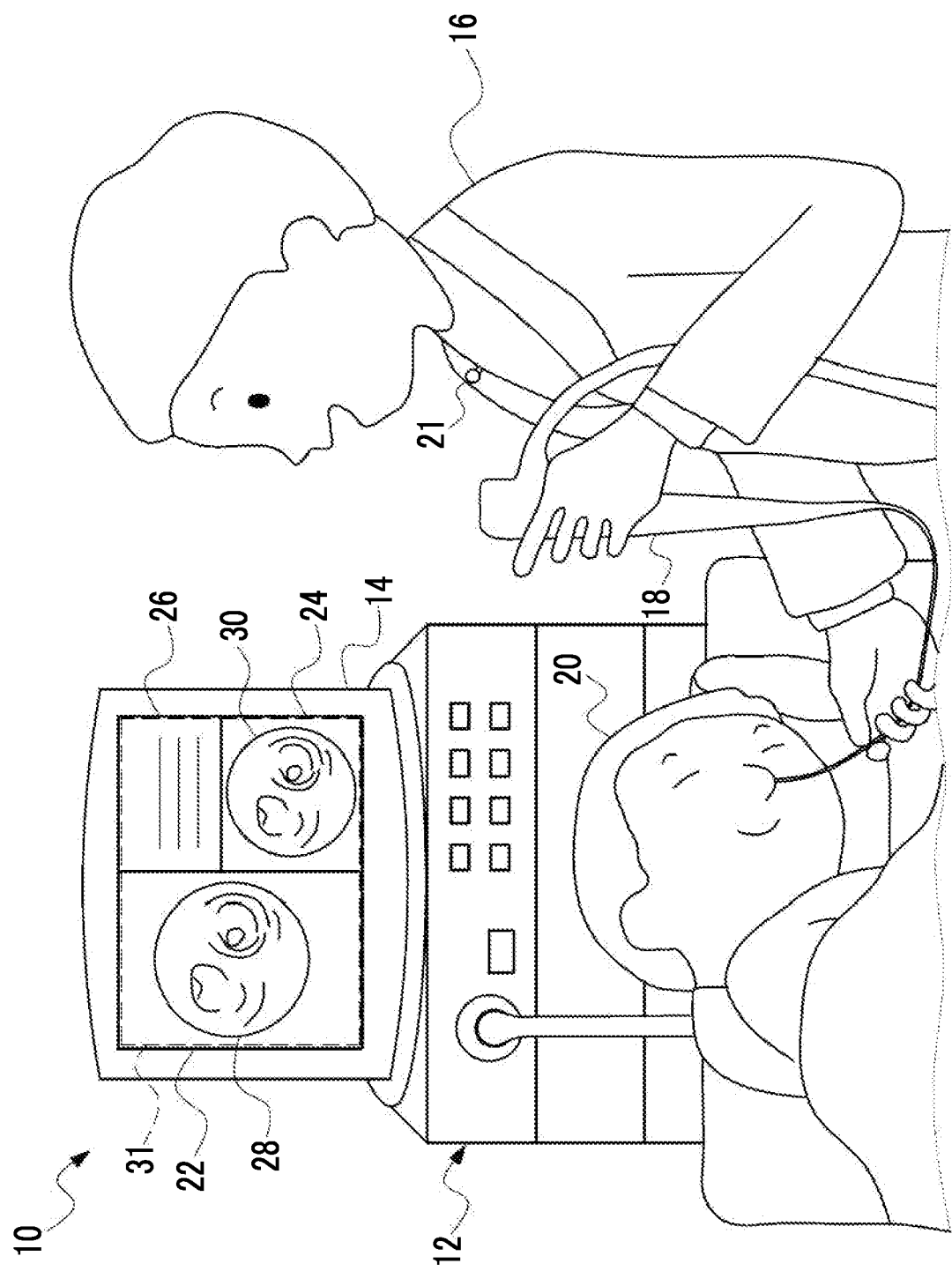
FIG. 1 is a conceptual diagram illustrating an example of an aspect in which an endoscope system is used.

For example, as illustrated in FIG. 1, an endoscope system 10 comprises an endoscope apparatus 12. The endoscope apparatus 12 has a display device 14. The endoscope apparatus 12 is used by a medical worker (hereinafter, referred to as a "user") such as a doctor 16. The endoscope apparatus 12 is an apparatus that comprises a bronchoscope 18 (an endoscope) and performs a medical treatment on a bronchus of a subject 20 (for example, a patient) through the bronchoscope 18. The bronchoscope 18 is an example of a "bronchoscope" according to the technology of the present disclosure. The display device 14 is an example of a "display device" according to the technology of the present disclosure.

The bronchoscope 18 is inserted into the bronchus of the subject 20 by the doctor 16, images the inside of the bronchus, acquires an image showing an aspect of the inside of the bronchus, and outputs the image. In the example illustrated in FIG. 1, an aspect in which the bronchoscope 18 is inserted into a luminal organ of a respiratory system through a nostril of the subject 20 is illustrated. In the example illustrated in FIG. 1, the bronchoscope 18 is inserted into the luminal organ of the respiratory system through the nostril of the subject 20. However, this is only an example, and the bronchoscope 18 may be inserted into the luminal organ of the respiratory system through a mouth of the subject 20. In addition, in this embodiment, the luminal organ of the respiratory system means an organ forming an air passage from an upper airway to a lower airway (for example, an organ including a trachea and the bronchus). Hereinafter, the luminal organ of the respiratory system is simply referred to as a "luminal organ".

The endoscope apparatus 12 comprises a microphone 21. The microphone 21 acquires a voice uttered by the doctor 16 and outputs a voice signal indicating the acquired voice to a predetermined output destination. An example of the microphone 21 is a pin microphone. In the example illustrated in FIG. 1, the microphone 21 is attached to a collar of the doctor 16. Further, the microphone 21 may be disposed at any position as long as it can acquire the voice of the doctor 16. A microphone having directivity toward the mouth of the doctor 16 is preferable. In the example illustrated in FIG. 1, the pin microphone is given as an example of the microphone 21. However, this is only an example, and the microphone 21 may be other types of microphones such as a stand microphone and a bone conduction microphone.

The display device 14 displays various types of information including images.

Examples of the display device 14 include a liquid crystal display and an EL display. A plurality of screens are displayed side by side on the display device 14. In the example illustrated in FIG. 1, a first screen 22, a second screen 24, and a third screen 26 are illustrated as an example of a plurality of screens.

An endoscope image 28 obtained by imaging the inside of the luminal organ (for example, the inside of the bronchus) of the subject 20 with the bronchoscope 18 is displayed on the first screen 22. An example of the endoscope image 28 is a video image (for example, a live view image). A virtual image 30 is displayed on the second screen 24. An example of the virtual image 30 is a video image. The virtual image 30 is a virtual image showing an aspect in which the inside of a virtual luminal organ simulating the luminal organ observed by the doctor 16 through the endoscope image 28 is observed from a viewpoint that is virtually set. For example, information related to the subject 20 and/or information related to the operation of the endoscope apparatus 12 is displayed on the third screen 26.

The display device 14 is provided with a touch panel 31. The touch panel 31 is superimposed on the screen of the display device 14 and receives an instruction from the user on the screen of the display device 14.

Figure 2:
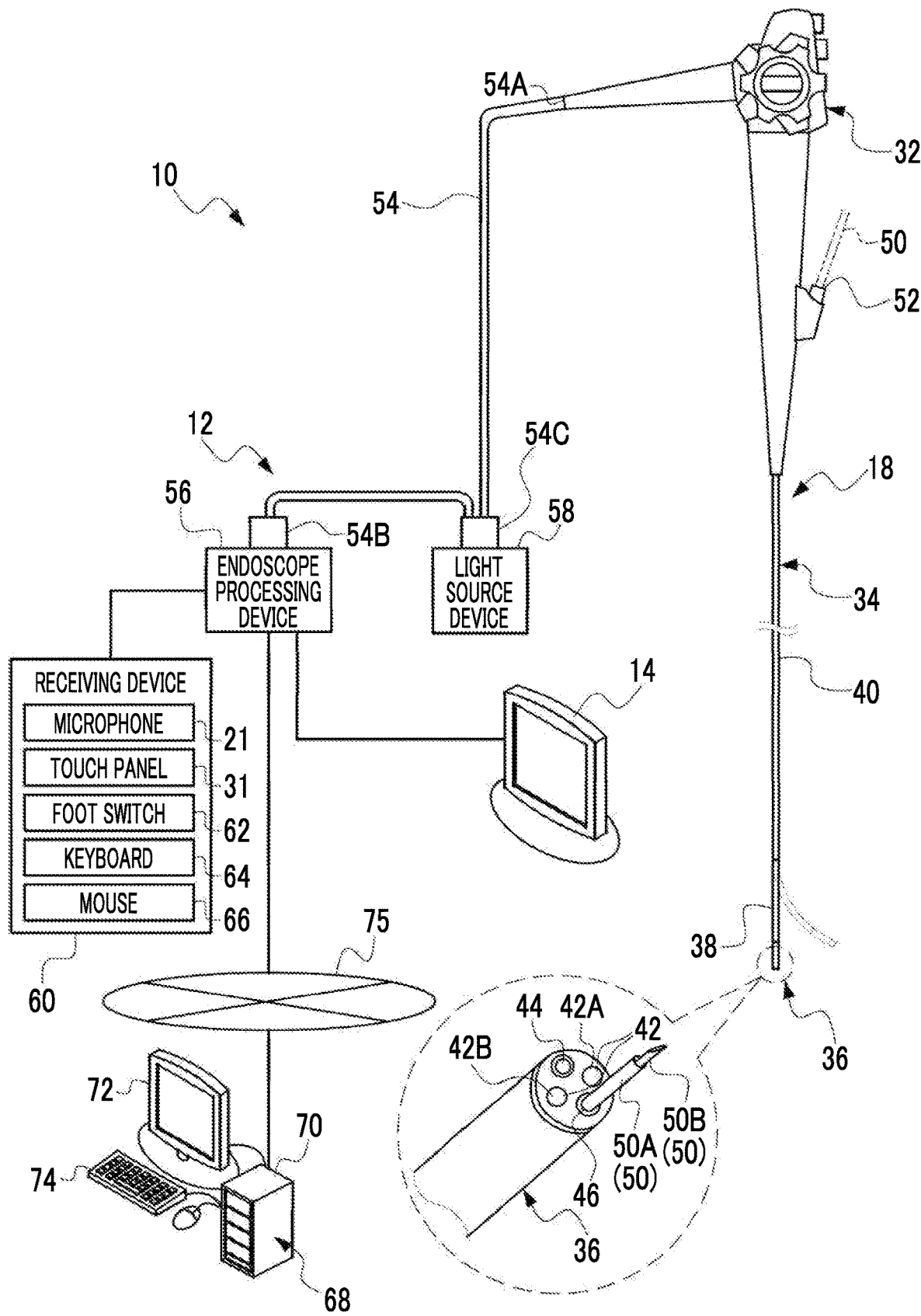
FIG. 2 is a conceptual diagram illustrating an example of an overall configuration of the endoscope system.

For example, as illustrated in FIG. 2, the bronchoscope 18 comprises an operation unit 32 and an insertion portion 34. The insertion portion 34 is formed in a tubular shape. The insertion portion 34 has a distal end part 36, a bendable part 38, and a soft part 40. The distal end part 36, the bendable part 38, and the soft part 40 are disposed in the order of the distal end part 36, the bendable part 38, and the soft part 40 from a distal end to a base end of the insertion portion 34. The soft part 40 is made of an elongated flexible material and connects the operation unit 32 and the bendable part 38. The bendable part 38 is partially bent or is rotated about an axis of the insertion portion 34 by the operation of the operation unit 32. As a result, the insertion portion 34 is moved to a back side of the luminal organ while being bent according to the shape of the luminal organ (for example, the shape of a bronchial tube) or while being rotated about the axis of the insertion portion 34.

The distal end part 36 is provided with an illumination device 42, an camera 44, and a treatment tool opening 46. The illumination device 42 has an illumination window 42A and an illumination window 42B. The illumination device 42 emits light (for example, white light consisting of three primary color light components or near-infrared light) through the illumination window 42A and the illumination window 42B. The camera 44 images the inside of the luminal organ using an optical method. An example of the camera 44 is a CMOS camera. The CMOS camera is only an example, and the camera 44 may be other types of cameras such as CCD cameras.

The treatment tool opening 46 is an opening through which a treatment tool 50 protrudes from the distal end part 36. In addition, the treatment tool opening 46 also functions as a suction opening for drawing, for example, blood and body waste. A treatment tool insertion opening 52 is formed in the operation unit 32, and the treatment tool 50 is inserted into the insertion portion 34 through the treatment tool insertion opening 52. The treatment tool 50 passes through the insertion portion 34 and protrudes from the treatment tool opening 46 to the outside. In the example illustrated in FIG. 2, a guide sheath 50A and a puncture needle 50B are illustrated as the treatment tool 50. The guide sheath 50A is inserted into the insertion portion 34 through the treatment tool insertion opening 52 and protrudes from the treatment tool opening 46 to the outside. The puncture needle 50B is inserted into the guide sheath 50A and protrudes from a distal end of the guide sheath 50A to the outside. Here, the guide sheath 50A and the puncture needle 50B are given as an example of the treatment tool 50. However, this is only an example, and the treatment tool 50 may be, for example, grasping forceps and/or an ultrasound probe. These tools may be inserted into the guide sheath 50A and then used.

The endoscope apparatus 12 comprises a universal cord 54, an endoscope processing device 56, a light source device 58, and a receiving device 60.

The universal cord 54 has a base end part 54A, a first distal end part 54B, and a second distal end part 54C. The base end part 54A is connected to the operation unit 32. The first distal end part 54B is connected to the endoscope processing device 56. The second distal end part 54C is connected to the light source device 58.

The receiving device 60 receives an instruction from the user. The receiving device 60 includes the microphone 21 (see FIG. 1), the touch panel 31 (see FIG. 1), a foot switch 62, a keyboard 64, and a mouse 66. The microphone 21, the touch panel 31, the foot switch 62, the keyboard 64, and the mouse 66 are only examples, and the receiving device 60 may include, for example, a track ball and a smart device. As described above, the device included in the receiving device 60 may be any device that receives an instruction from the user and outputs the received instruction as an electric signal.

The receiving device 60 is connected to the endoscope processing device 56. The endoscope processing device 56 transmits and receives various signals to and from the camera 44 or controls the light source device 58 according to the instruction received by the receiving device 60. The endoscope processing device 56 directs the camera 44 to perform imaging, acquires the endoscope image 28 (see FIG. 1) from the camera 44, and outputs the endoscope image 28. The light source device 58 emits light under the control of the endoscope processing device 56 and supplies the light to the illumination device 42. A light guide is provided in the illumination device 42, and the light supplied from the light source device 58 is emitted from the illumination windows 42A and 42B through the light guide.

The display device 14 is connected to the endoscope processing device 56. The endoscope processing device 56 controls the display device 14 according to the instruction received by the receiving device 60. The endoscope processing device 56 displays the endoscope image 28 obtained by imaging a region to be observed with the camera 44 on the display device 14 (see FIG. 1).

The endoscope system 10 comprises a server 68. The server 68 includes a computer 70 which is a main body of the server 68, a display device 72, and a receiving device 74. The computer 70 is an example of a "computer" according to the technology of the present disclosure. The computer 70 and the endoscope processing device 56 are connected through a network 75 such that they communicate with each other. An example of the network 75 is a LAN. In addition, the LAN is only an example, and the network 75 may be configured by, for example, at least one of the LAN or a WAN.

The endoscope processing device 56 is positioned as a client terminal with respect to the server 68. Therefore, the server 68 performs a process corresponding to a request given from the endoscope processing device 56 through the network 75 and provides the result of the process to the endoscope processing device 56 through the network 75.

The display device 72 and the receiving device 74 are connected to the computer 70. The display device 72 displays various types of information under the control of the computer 70. Examples of the display device 72 include a liquid crystal display and an EL display. The receiving device 74 receives an instruction from, for example, the user of the server 68. Examples of the receiving device 74 include a keyboard and a mouse. The computer 70 performs a process corresponding to the instruction received by the receiving device 74.

Figure 3:
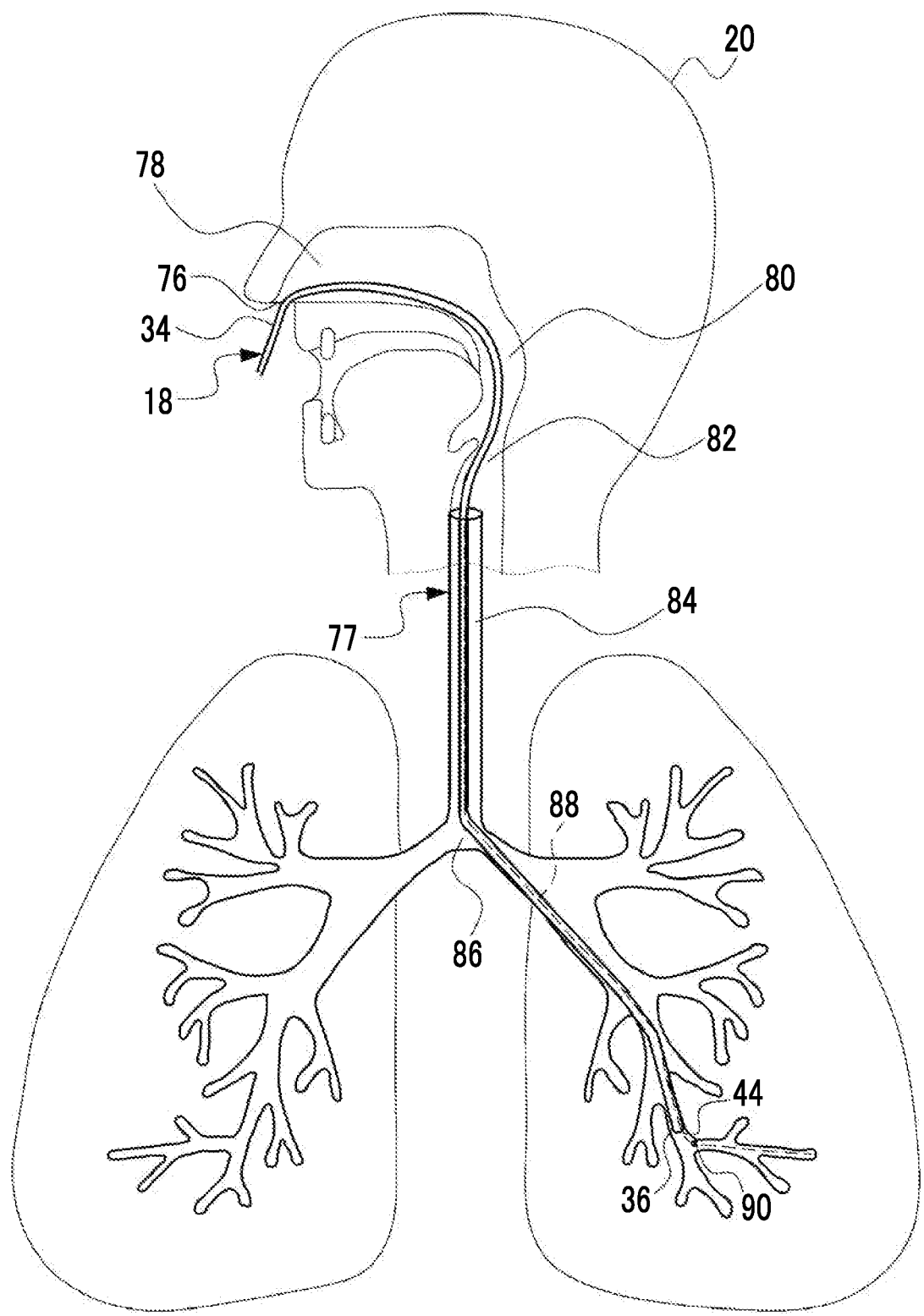
FIG. 3 is a conceptual diagram illustrating an example of an aspect in which an insertion portion of a bronchoscope is inserted into a luminal organ of a subject.

For example, as illustrated in FIG. 3, the insertion portion 34 of the bronchoscope 18 is inserted into a luminal organ 77 through a nostril 76 of the subject 20. That is, the insertion portion 34 is inserted into a bronchus 86 from the nostril 76 through a nasal cavity 78, a pharynx 80, a larynx 82, and a trachea 84. The distal end part 36 is moved into a back side of the bronchus 86 along a scheduled route 88 in the bronchus 86. The distal end part 36 moved to the back side of the bronchus 86 eventually reaches a predetermined position 90 in the bronchus 86. An example of the position 90 is a position that is several millimeters upstream from the position where the distal end part 36 is not capable of being physically inserted into the back side of the bronchus 86 due to the magnitude relationship between the inner diameter of the bronchus 86 and the outer diameter of the insertion portion 34 or a position that is preplanned as the position where some kind of treatment is performed on a lesion (for example, a lesion positioned in a peripheral portion of the bronchus 86). Here, an example of some kind of treatment is the collection of tissues using the guide sheath 50A and the puncture needle 50B (see FIG. 2).

While the distal end part 36 is inserted into the luminal organ 77, the camera 44 images the inside of the bronchus 86 at a predetermined frame rate. An example of the predetermined frame rate is several tens of frames/second (for example, 30 frames/second or 60 frames/second).

Figure 4:
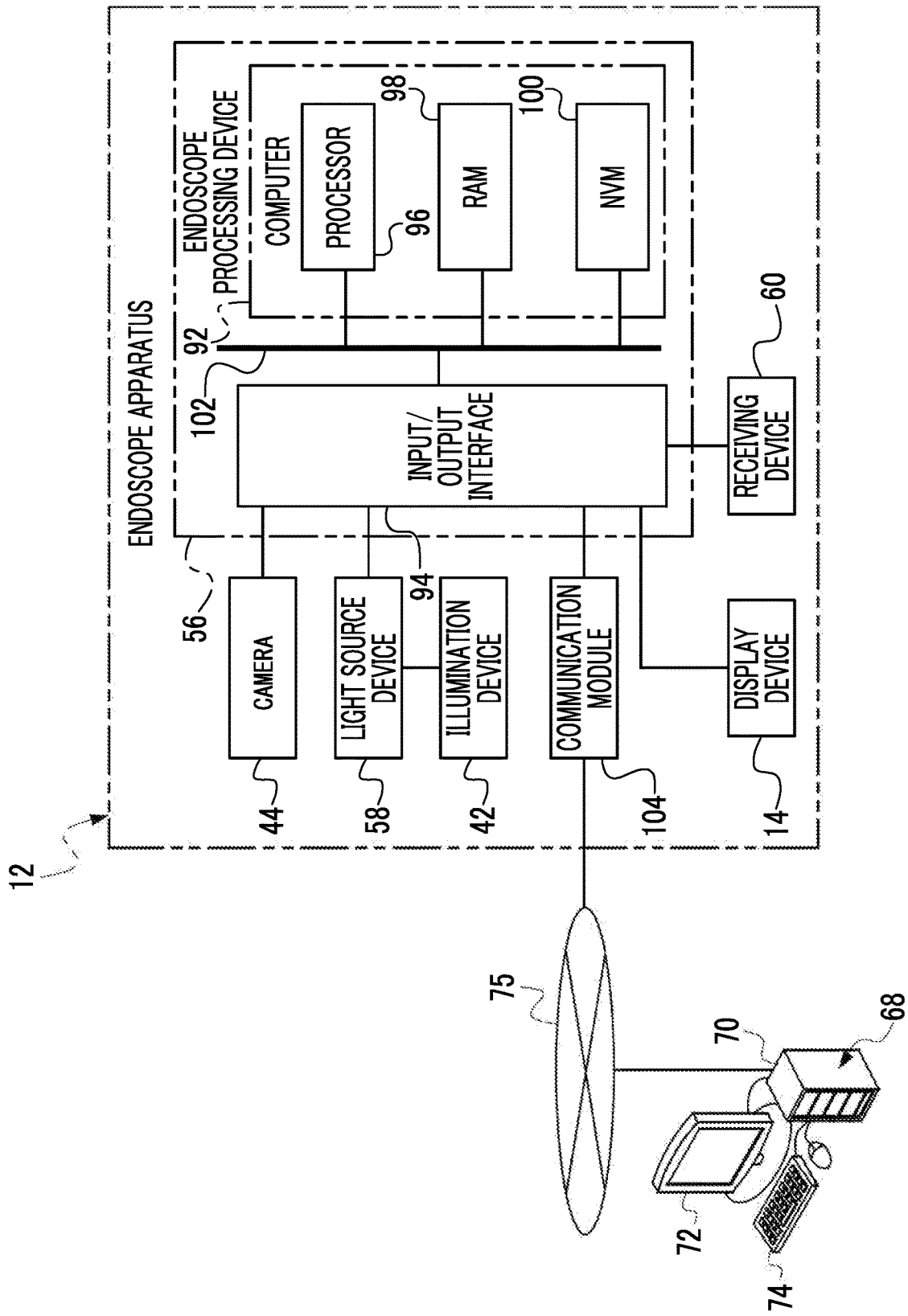
FIG. 4 is a block diagram illustrating an example of a hardware configuration of an endoscope apparatus.

For example, as illustrated in FIG. 4, the endoscope processing device 56 comprises a computer 92 and an input/output interface 94. The computer 92 is an example of a "computer" according to the technology of the present disclosure. The computer 92 comprises a processor 96, a RAM 98, and an NVM 100. The input/output interface 94, the processor 96, the RAM 98, and the NVM 100 are connected to a bus 102.

The processor 96 includes, for example, a DSP, a CPU, and a GPU and controls the entire endoscope processing device 56. The DSP and the GPU operate under the control of the CPU. In addition, the processor 96 may be one or more CPUs with which the functions of the GPU have been integrated or may be one or more CPUs with which the functions of the GPU have not been integrated.

The RAM 98 is a memory that temporarily stores information and is used as a work memory by the processor 96. The NVM 100 is a non-volatile storage device that stores, for example, various programs and various parameters. An example of the NVM 100 is a flash memory (for example, an EEPROM and/or an SSD). In addition, the flash memory is only an example and may be other non-volatile storage devices, such as HDDs, or a combination of two or more types of non-volatile storage devices.

The receiving device 60 is connected to the input/output interface 94, and the processor 96 acquires the instruction received by the receiving device 60 through the input/output interface 94 and performs a process corresponding to the acquired instruction.

The camera 44 is connected to the input/output interface 94. The processor 96 controls the camera 44 through the input/output interface 94 or acquires the endoscope image 28 (see FIG. 1) obtained by imaging the inside of the luminal organ 77 of the subject 20 with the camera 44 through the input/output interface 94.

The light source device 58 is connected to the input/output interface 94. The processor 96 controls the light source device 58 through the input/output interface 94 such that light is supplied to the illumination device 42 or the amount of light supplied to the illumination device 42 is adjusted.

The display device 14 is connected to the input/output interface 94, and the processor 96 controls the display device 14 through the input/output interface 94 such that various types of information are displayed on the display device 14. For example, the processor 96 displays the endoscope image 28 and the virtual image 30 on the display device 14.

The endoscope apparatus 12 comprises a communication module 104. The communication module 104 is connected to the input/output interface 94. The communication module 104 is an interface including, for example, a communication processor and an antenna. The communication module 104 is connected to the network 75 and controls communication between the processor 96 and the computer 70 of the server 68.

Figure 5:
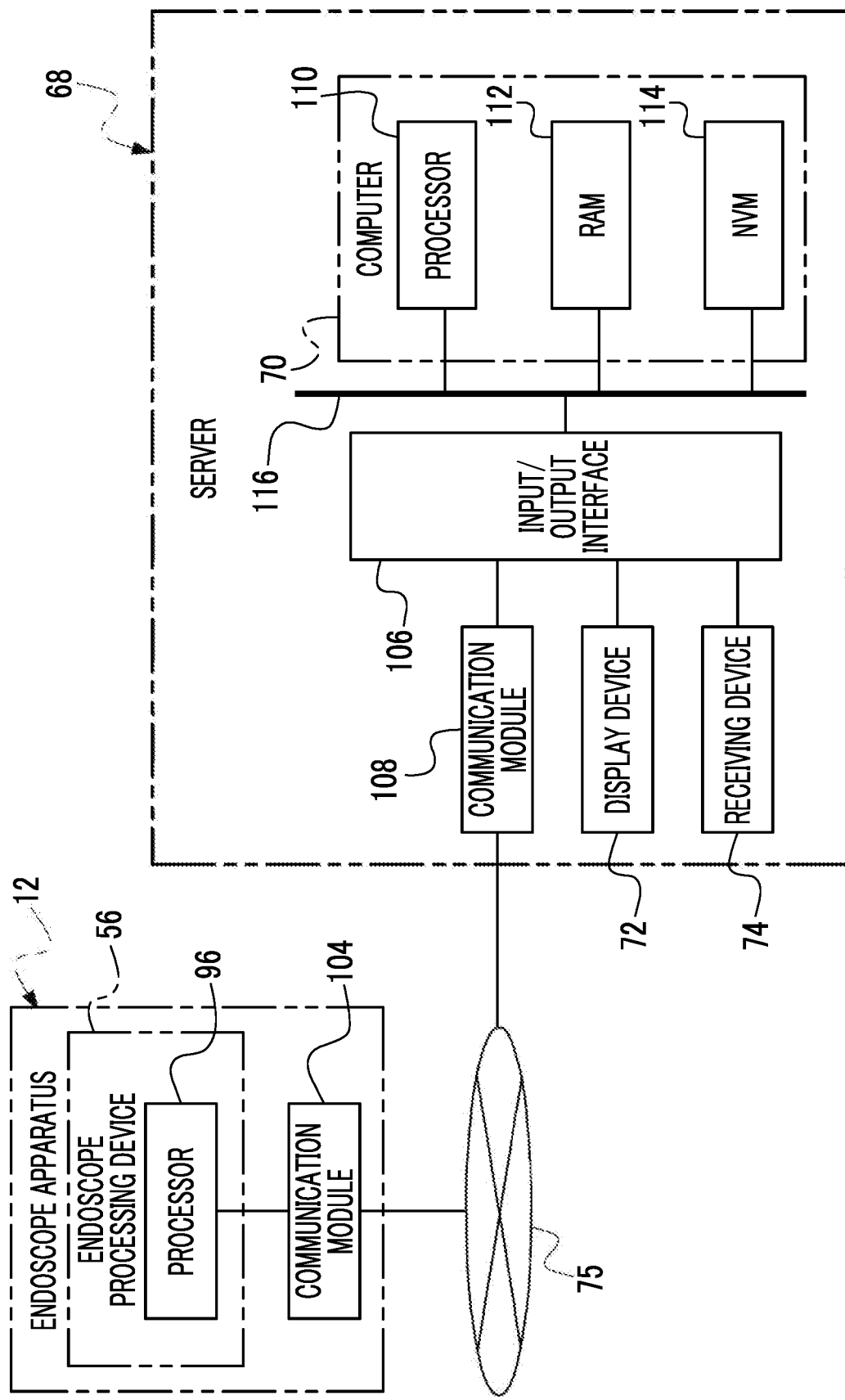
FIG. 5 is a block diagram illustrating an example of a hardware configuration of a server.

For example, as illustrated in FIG. 5, the server 68 comprises an input/output interface 106 that is the same as the input/output interface 94 (see FIG. 4) and a communication module 108 that is the same as the communication module 104 in addition to the computer 70, the display device 72, and the receiving device 74. The computer 70 includes a processor 110 that is the same as the processor 96, a RAM 112 that is the same as the RAM 98 (see FIG. 4), and an NVM 114 that is the same as the NVM 100 (see FIG. 4). The input/output interface 106, the processor 110, the RAM 112, and the NVM 114 are connected to a bus 116.

The display device 72 is connected to the input/output interface 106, and the processor 110 controls the display device 72 through the input/output interface 106 such that various types of information are displayed on the display device 72.

The receiving device 74 is connected to the input/output interface 106, and the processor 110 acquires the instruction received by the receiving device 74 through the input/output interface 106 and performs a process corresponding to the acquired instruction.

The communication module 108 is connected to the input/output interface 106. The communication module 108 is connected to the network 75 and performs communication between the processor 110 of the server 68 and the processor 96 of the endoscope processing device 56 in cooperation with the communication module 104.

In addition, the endoscope processing device 56 and the server 68 are an example of an "information processing apparatus" according to the technology of the present disclosure. In addition, the processors 96 and 110 are an example of a "processor" according to the technology of the present disclosure.

However, in a case in which it has been found that a lesion is present in a peripheral portion of the bronchus 86 and some kind of treatment (for example, tissue collection) is performed on the lesion in a peripheral portion of the bronchus 86 using the bronchoscope 18, it is preferable that the distal end part 36 of the bronchoscope 18 reaches a position close to the peripheral portion of the bronchus 86. The reason is that the treatment tool 50 protrudes from the distal end part 36 of the bronchoscope 18 and the treatment is performed on the lesion using the protruding treatment tool 50.

However, since the inner diameter of the bronchus 86 is smaller than the outer diameter of the insertion portion 34, there is a situation in which it is physically difficult for the distal end part 36 of the bronchoscope 18 to reach the peripheral portion of the bronchus 86. It is important to make the user understand in advance that the user will encounter this situation (that is, to make the user ascertain what position in the bronchus 86 the distal end part 36 of the bronchoscope 18 can physically reach) in the treatment on the lesion using the bronchoscope 18. For example, in a case in which the user is planning a treatment using the guide sheath 50A, an appropriate position is planned as the position where the guide sheath 50A protrudes from the distal end part 36 of the bronchoscope 18 in the bronchus 86, and the distal end part 36 of the bronchoscope 18 reaches the planned position, which is effective in performing the treatment using the guide sheath 50A.

Figure 18:
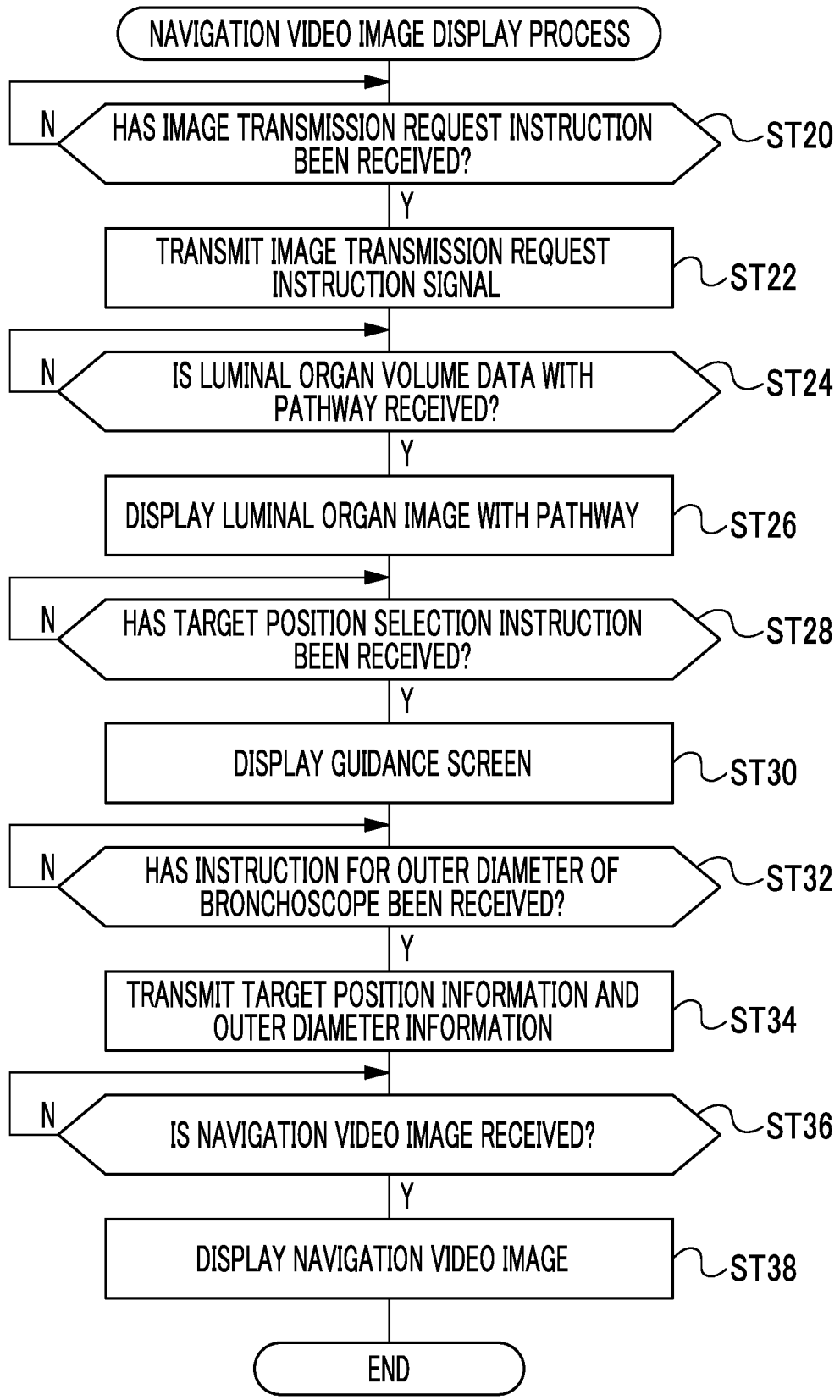
FIG. 18 is a flowchart illustrating an example of a flow of a navigation video image display process.
Figure 19:
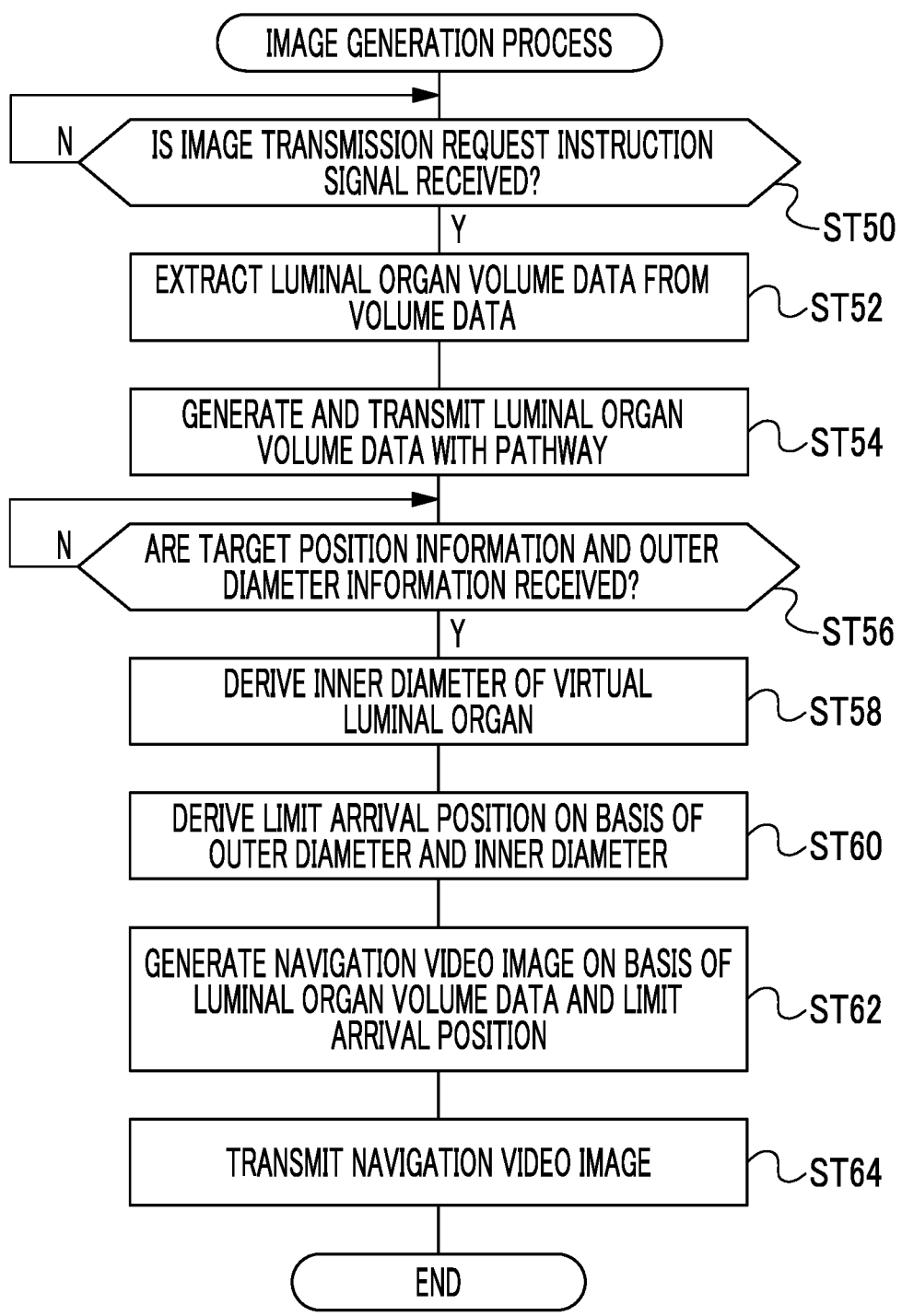
FIG. 19 is a flowchart illustrating an example of a flow of an image generation process.

Therefore, in view of these circumstances, in this embodiment, the processor 96 of the endoscope processing device 56 performs a navigation video image display process and an endoscope image display process (see FIGS. 6, 17, and 18), and the processor 110 of the server 68 performs an image generation process (see FIG. 19).

Figure 6:
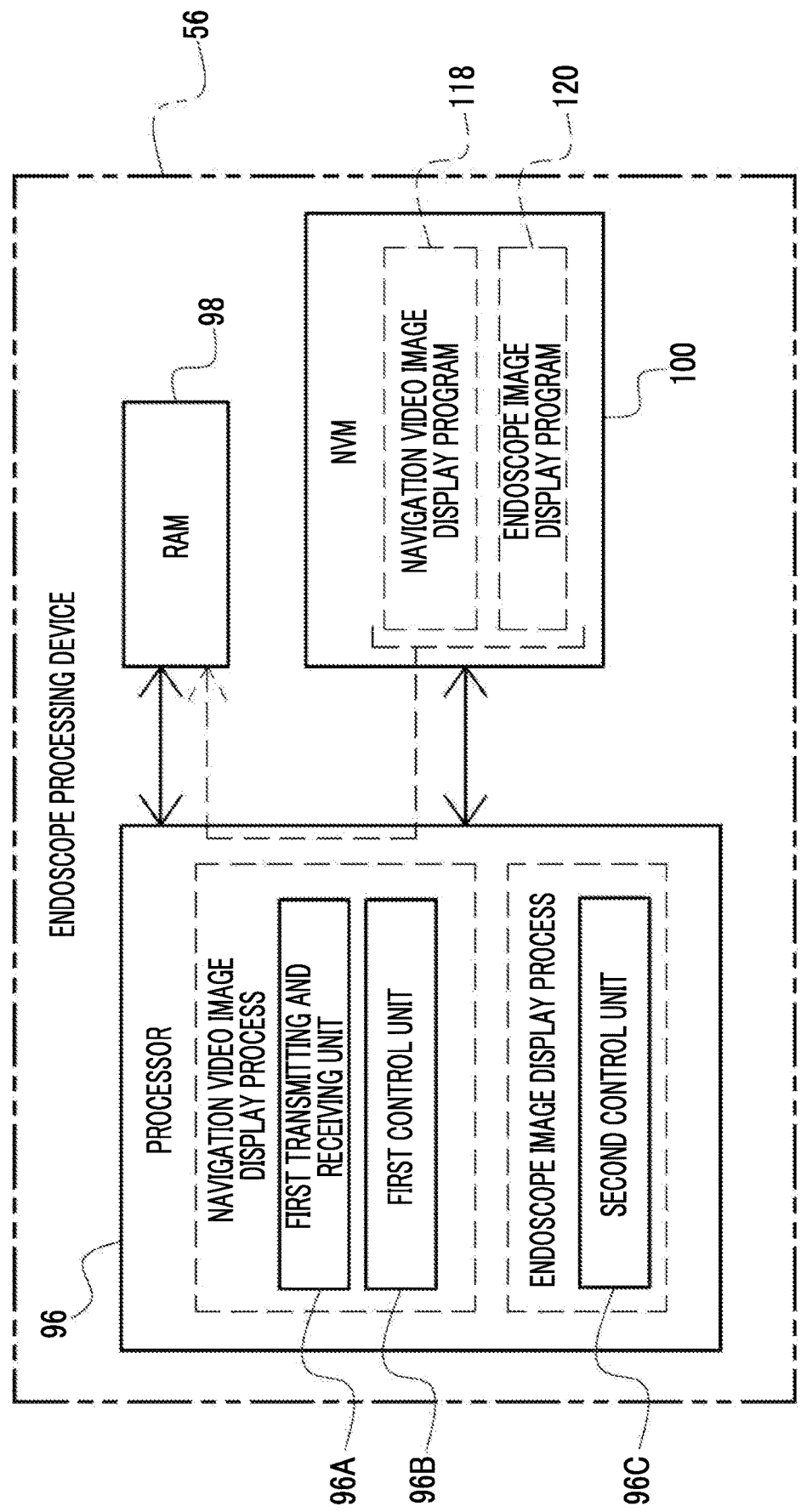
FIG. 6 is a block diagram illustrating an example of functions of main units of a processor of an endoscope processing device.

For example, as illustrated in FIG. 6, a navigation video image display program 118 is stored in the NVM 100. The navigation video image display program 118 is an example of a "program" according to the technology of the present disclosure. The processor 96 reads the navigation video image display program 118 from the NVM 100 and executes the read navigation video image display program 118 on the RAM 98 to perform the navigation video image display process. The processor 96 operates as a first transmitting and receiving unit 96A and a first control unit 96B according to the navigation video image display program 118 to implement the navigation video image display process.

In addition, an endoscope image display program 120 is stored in the NVM 100. The processor 96 reads the endoscope image display program 120 from the NVM 100 and executes the read endoscope image display program 120 on the RAM 98 to perform an endoscope image display process. The processor 96 operates as a second control unit 96C according to the endoscope image display program 120 to implement the endoscope image display process.

Figure 7:
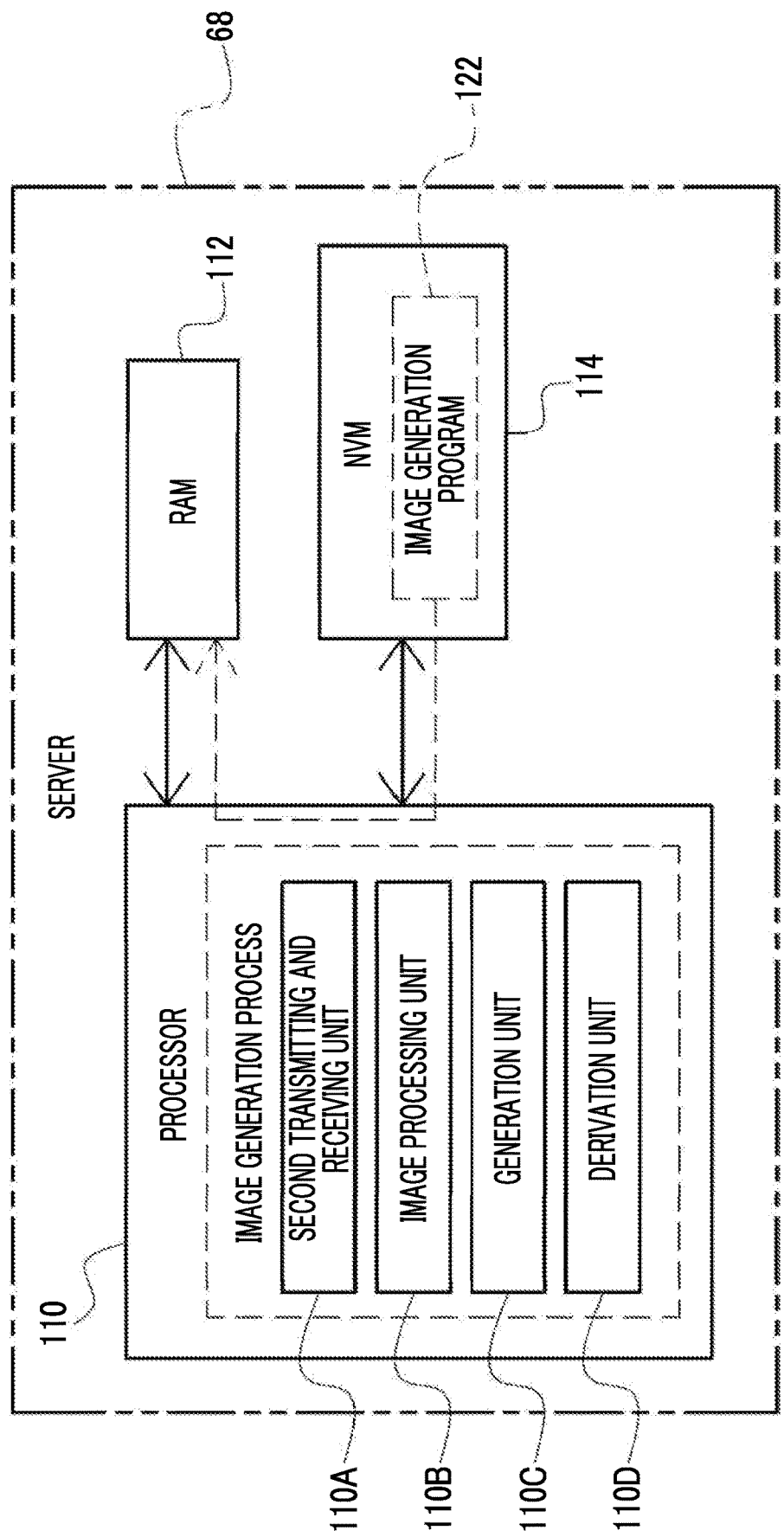
FIG. 7 is a block diagram illustrating an example of functions of main units of a processor of a server.

For example, as illustrated in FIG. 7, an image generation program 122 is stored in the NVM 114. The image generation program 122 is an example of the "program" according to the technology of the present disclosure. The processor 110 reads the image generation program 122 from the NVM 114 and executes the read image generation program 122 on the RAM 112 to perform the image generation process. The processor 110 operates as a second transmitting and receiving unit 110A, an image processing unit 110B, a generation unit 110C, and a derivation unit 110D according to the image generation program 122 to implement the image generation process.

Figure 8:
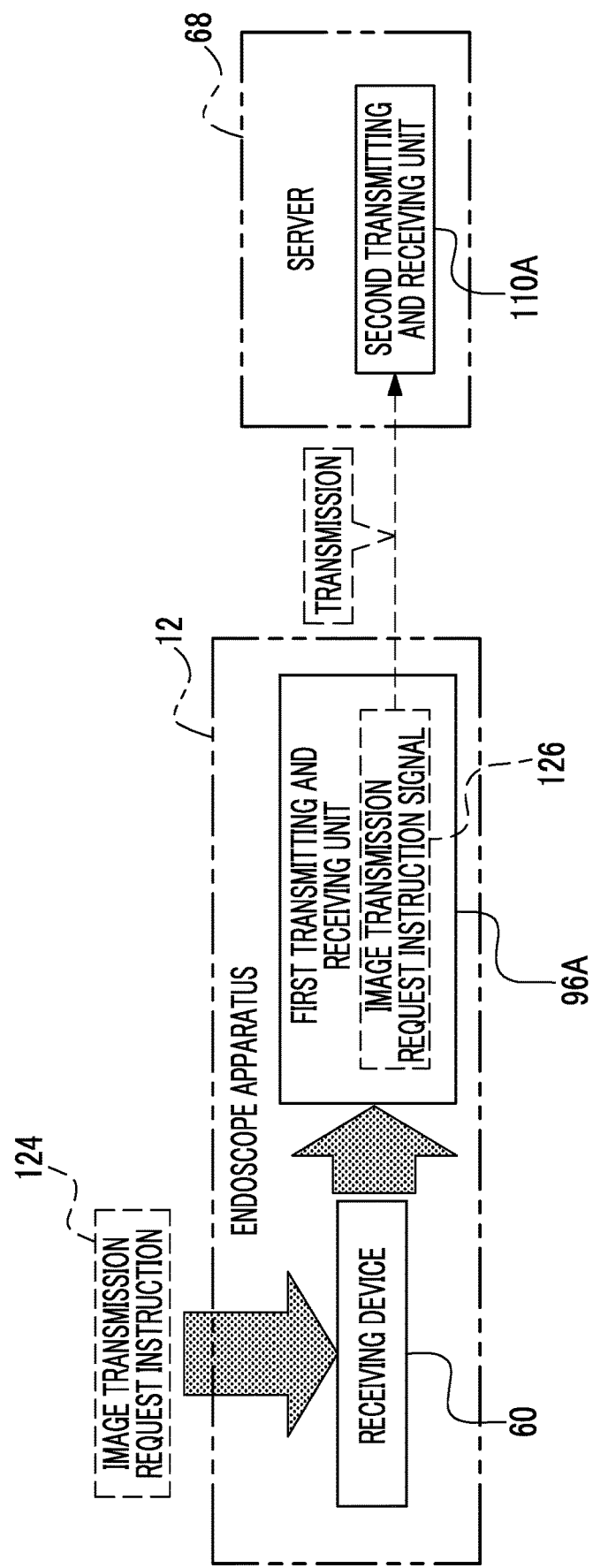
FIG. 8 is a conceptual diagram illustrating an example of an aspect in which an image transmission request signal is transmitted from the endoscope apparatus to the server.

For example, as illustrated in FIG. 8, in the endoscope apparatus 12, the receiving device 60 receives an image transmission request instruction 124 from the user. The image transmission request instruction 124 is an instruction to request the server 68 to transmit an image. The first transmitting and receiving unit 96A transmits an image transmission request instruction signal 126, which is a signal indicating the image transmission request instruction 124 received by the receiving device 60, to the server 68. In the server 68, the second transmitting and receiving unit 110A receives the image transmission request instruction signal 126 transmitted from the first transmitting and receiving unit 96A. In a case in which the second transmitting and receiving unit 110A receives the image transmission request instruction signal 126, the processor 110 of the server 68 performs the process illustrated in FIGS. 9 and 10.

Figure 9:
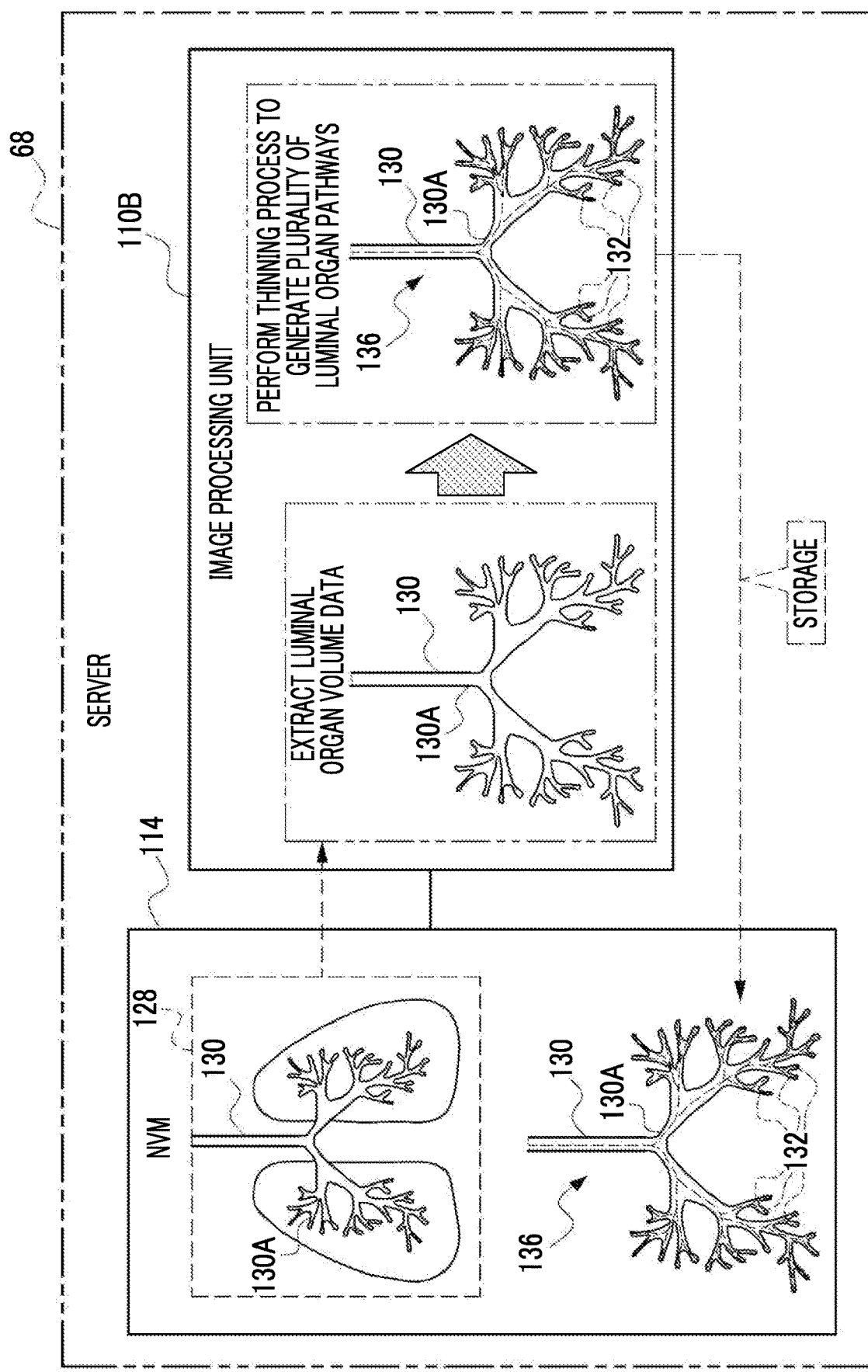
FIG. 9 is a conceptual diagram illustrating an example of content of a process of an image processing unit of the server.

For example, as illustrated in FIG. 9, in the server 68, volume data 128 is stored in the NVM 114. The volume data 128 is an example of "volume data" according to the technology of the present disclosure. The volume data 128 is a three-dimensional image in which a plurality of two-dimensional slice images obtained by imaging the whole body or a part (for example, a chest) of the body of the subject 20 with a modality are stacked and defined by voxels. The position of each voxel is specified by three-dimensional coordinates. An example of the modality is a CT apparatus. The CT apparatus is only an example, and other examples of the modality are an MM apparatus and an ultrasound diagnostic apparatus.

The volume data 128 includes luminal organ volume data 130 which is a three-dimensional image showing a virtual luminal organ 130A. The virtual luminal organ 130A means a virtual luminal organ that imitates the luminal organ 77 of the subject 20. The luminal organ volume data 130 is an example of a "bronchial image" according to the technology of the present disclosure.

The image processing unit 110B extracts the luminal organ volume data 130 from the volume data 128 and acquires a plurality of luminal organ pathways 132 from the luminal organ volume data 130. The plurality of luminal organ pathways 132 are generated by performing a thinning process on the luminal organ volume data 130. The luminal organ pathway 132 is a three-dimensional line that passes through the center of the virtual luminal organ 130A in a cross-sectional view. The three-dimensional line passing through the center of the virtual luminal organ 130A in a cross-sectional view is obtained by thinning the luminal organ volume data 130. The number of luminal organ pathways 132 corresponds to the number of peripheries of the bronchi 86 (see FIG. 3) indicated by the luminal organ volume data 130. In addition, each luminal organ pathway 132 is the shortest pathway to the periphery of the corresponding bronchus 86. In addition, the luminal organ pathway 132 is an example of the "shortest pathway" according to the technology of the present disclosure.

The image processing unit 110B generates luminal organ volume data 136 with a pathway and stores the generated luminal organ volume data 136 with a pathway in the NVM 114. The luminal organ volume data 136 with a pathway is a three-dimensional image obtained by integrating the luminal organ volume data 130 and a plurality of luminal organ pathways 132.

Figure 10:
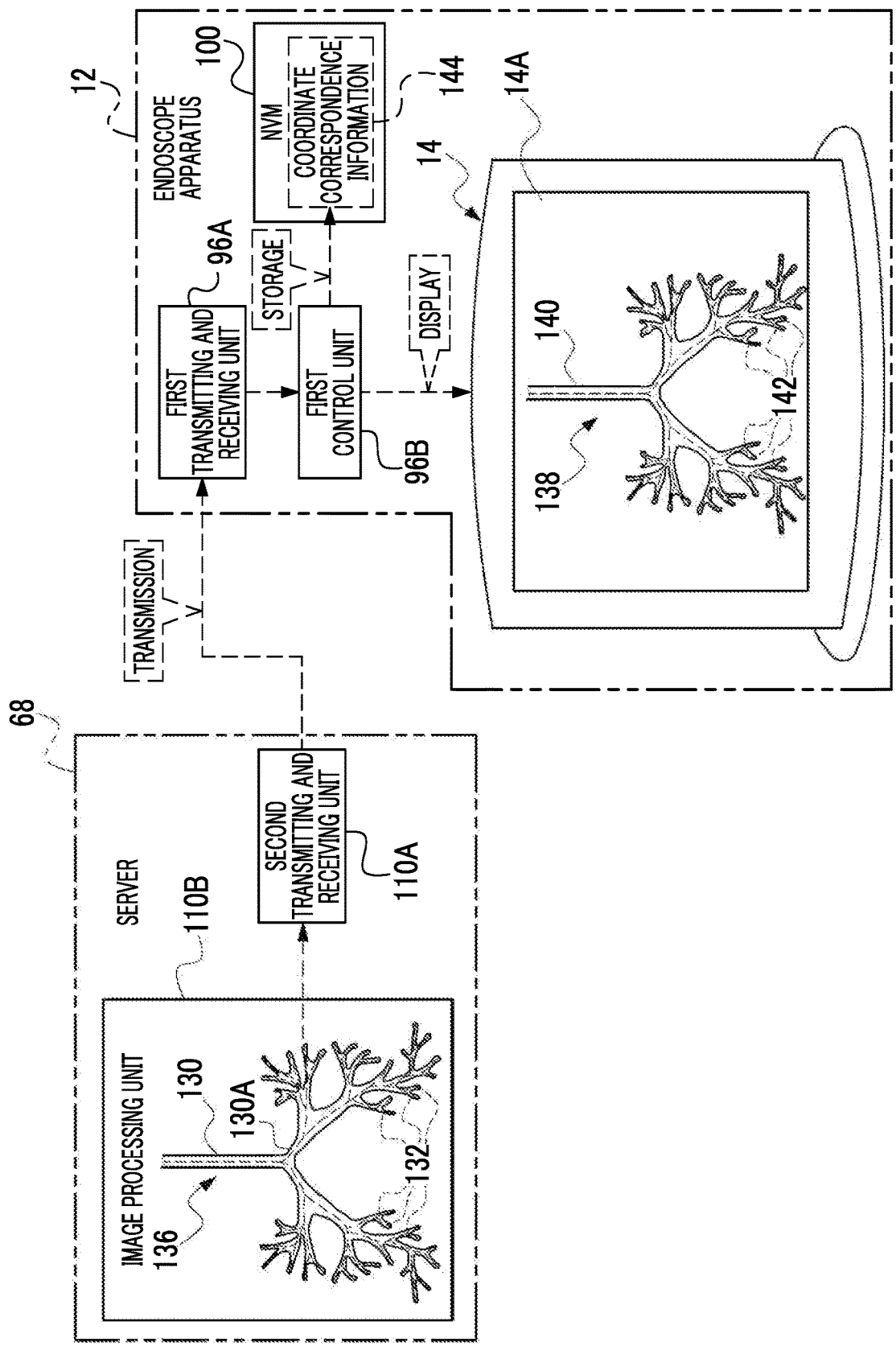
FIG. 10 is a conceptual diagram illustrating an example of content of processes of a first transmitting and receiving unit and a first control unit included in the endoscope apparatus.

For example, as illustrated in FIG. 10, in the server 68, the luminal organ volume data 136 with a pathway generated by the image processing unit 110B is transmitted to the endoscope apparatus 12 by the second transmitting and receiving unit 110A. In the endoscope apparatus 12, the first transmitting and receiving unit 96A receives the luminal organ volume data 136 with a pathway transmitted from the second transmitting and receiving unit 110A.

In the endoscope apparatus 12, the first control unit 96B generates a luminal organ image 138 with a pathway on the basis of the luminal organ volume data 136 with a pathway received by the first transmitting and receiving unit 96A and displays the luminal organ image 138 with a pathway on the display device 14. The luminal organ image 138 with a pathway is a rendered image of the luminal organ volume data 136 with a pathway on the screen 14A of the display device 14. The luminal organ image 138 with a pathway is a rendered image obtained by integrating a luminal organ image 140 and a luminal organ pathway 142. The luminal organ image 140 is a rendered image corresponding to the luminal organ volume data 130, and the luminal organ pathway 142 is a rendered image corresponding to the luminal organ pathway 132.

The first control unit 96B generates coordinate correspondence information 144 and stores the coordinate correspondence information 144 in the NVM 100. The coordinate correspondence information 144 is information in which three-dimensional coordinates before rendering (that is, three-dimensional coordinates of the luminal organ volume data 136 with a pathway) and two-dimensional coordinates after rendering (that is, two-dimensional coordinates of the luminal organ image 138 with a pathway) are associated with each other.

Figure 11:
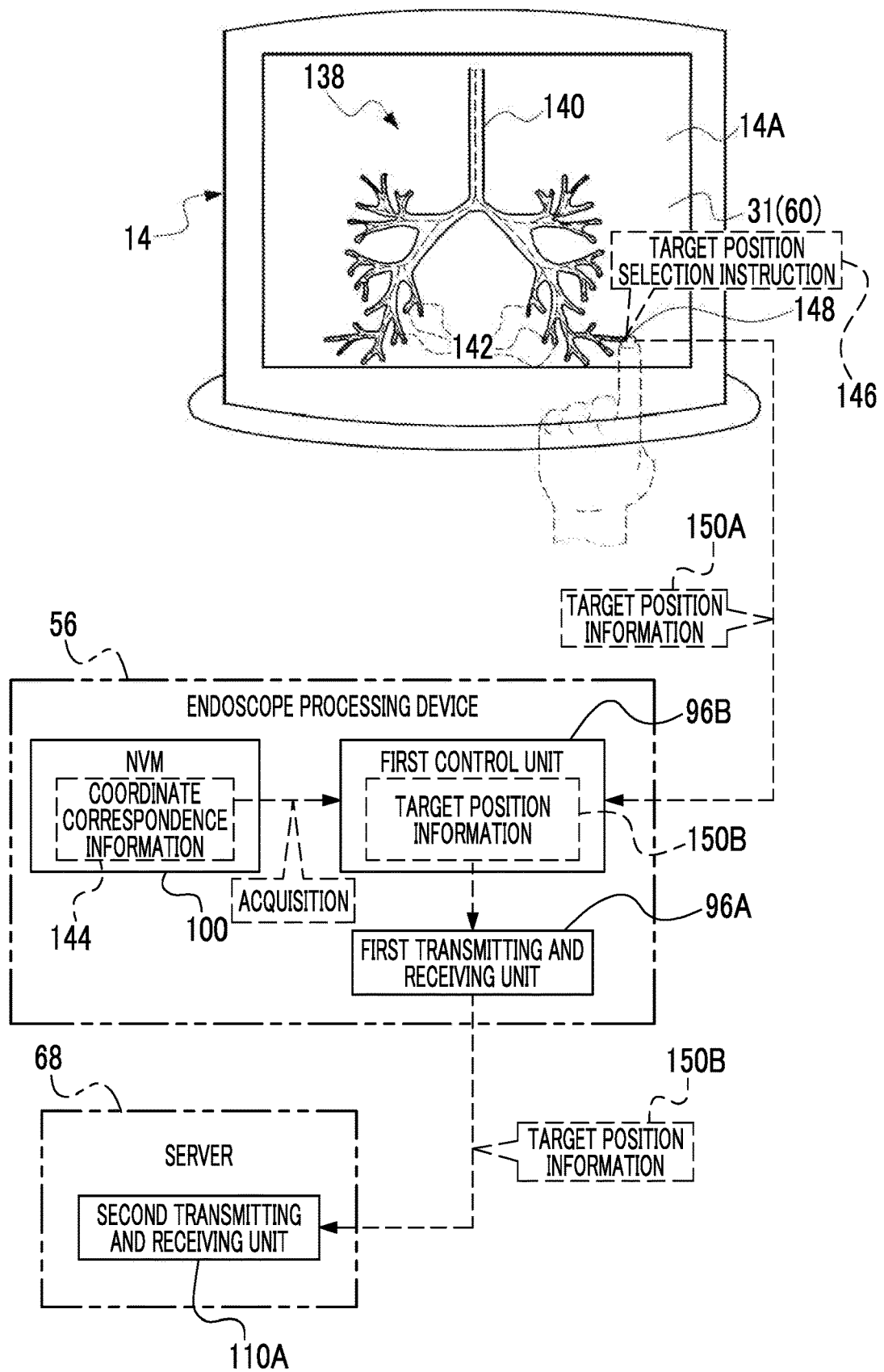
FIG. 11 is a conceptual diagram illustrating an example of the content of the processes of the first control unit and the first transmitting and receiving unit in a case in which a target position selection instruction is received by a receiving device.

For example, as illustrated in FIG. 11, the receiving device 60 receives a target position selection instruction 146 from the user in a state in which the luminal organ image 138 with a pathway is displayed on the screen 14A of the display device 14. In the example illustrated in FIG. 11, the target position selection instruction 146 is received by the touch panel 31. Here, an aspect in which the target position selection instruction 146 is received by the touch panel 31 is given as an example. However, this is only an example, and the target position selection instruction 146 may be received by, for example, the microphone 21, the foot switch 62, the keyboard 64, and/or the mouse 66 (see FIG. 2).

The target position selection instruction 146 is an instruction to select a target position 148 in the luminal organ image 140. An example of the target position 148 is a position corresponding to a portion in which a lesion is present (that is, a portion in which a lesion scheduled for treatment using the bronchoscope 18 is present) in the luminal organ 77 (see FIG. 3) in the luminal organ image 138 with a pathway displayed on the screen 14A. In the example illustrated in FIG. 11, a position corresponding to the periphery (for example, the periphery of the bronchus 86) on one luminal organ pathway 142 among a plurality of luminal organ pathways 142 is given as an example of the target position 148. In addition, here, the aspect in which a position corresponding to the periphery on one luminal organ pathway 142 is selected as the target position 148 is given as an example. However, this is only an example, and each of a plurality of positions on two or more luminal organ pathways 142 may be selected as the target position 148.

In a case in which the target position selection instruction 146 is received by the touch panel 31, the first control unit 96B acquires target position information 150A from the touch panel 31. The target position information 150A is coordinates that specify the target position 148 selected by the target position selection instruction 146. The first control unit 96B acquires the coordinate correspondence information 144 from the NVM 100 and converts the target position information 150A into target position information 150B with reference to the coordinate correspondence information 144. The conversion of the target position information 150A into the target position information 150B is implemented by acquiring three-dimensional coordinates corresponding to the target position information 150A as the target position information 150B from the coordinate correspondence information 144. The first transmitting and receiving unit 96A transmits the target position information 150B acquired by the first control unit 96B to the server 68. In the server 68, the second transmitting and receiving unit 110A receives the target position information 150B transmitted from the first transmitting and receiving unit 96A.

Figure 12:
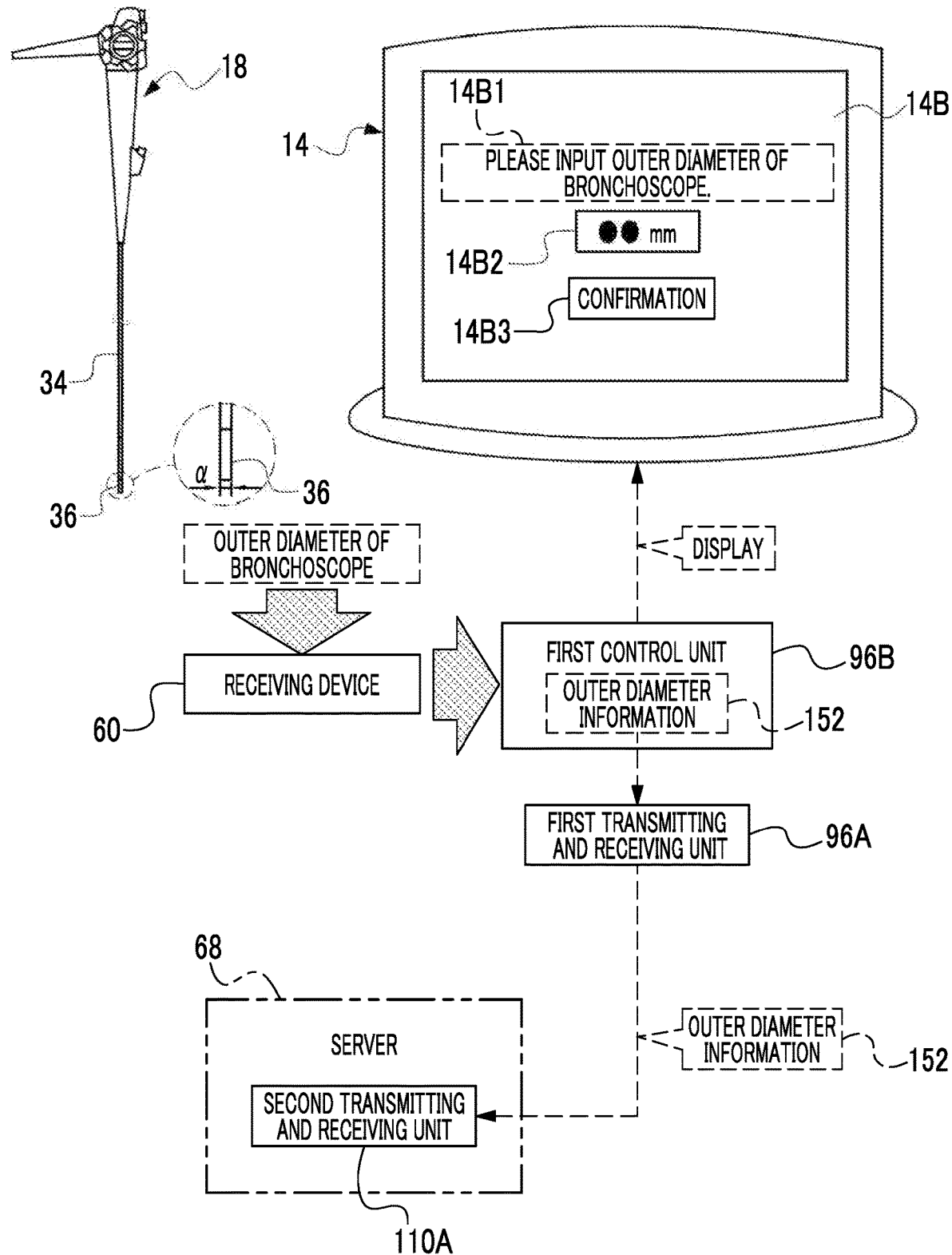
FIG. 12 is a conceptual diagram illustrating an example of the content of the processes of the first control unit and the first transmitting and receiving unit in a case in which an outer diameter of the insertion portion of the bronchoscope is received by the receiving device.

In a case in which the reception of the target position selection instruction 146 by the touch panel 31 is completed, the first control unit 96B displays a guidance screen 14B on the display device 14. The guidance screen 14B is a screen that guides the user to input an outer diameter α of the bronchoscope 18 to the endoscope processing device 56. The outer diameter α is the outer diameter of the insertion portion 34. The outer diameter of the insertion portion 34 means, for example, the outer diameter of the thickest part of the insertion portion 34 in an axial direction (in other words, a longitudinal direction of the insertion portion 34) (in the example illustrated in FIG. 12, the outer diameter of the distal end part 36).

A guidance message 14B1, an outer diameter input region 14B2, and a confirmation key 14B3 are displayed on the guidance screen 14B. The guidance message 14B1 is a message that prompts the input of the outer diameter α. In the example illustrated in FIG. 12, a message "Please input the outer diameter of the bronchoscope" is illustrated. However, this is only an example, and any message may be used as long as it prompts the input of the outer diameter of the bronchoscope 18. The outer diameter input region 14B2 is a region for inputting the outer diameter of the bronchoscope 18. In a case in which the outer diameter α is received by the receiving device 60, the received outer diameter α is displayed in the outer diameter input region 14B2.

In addition, the outer diameter input region 14B2 may be an input region of a pull-down menu type. In this case, for example, a plurality of outer diameters α may be displayed in the pull-down menu. In a case in which one outer diameter α is selected from the plurality of displayed outer diameters α, the selected outer diameter α may be displayed in the outer diameter input region 14B2. In addition, for example, a plurality of types of bronchoscopes 18 may be displayed in the pull-down menu. In a case in which one bronchoscope 18 is selected from the plurality of types of displayed bronchoscopes 18, the outer diameter α of the selected bronchoscope 18 may be displayed in the outer diameter input region 14B2. In addition, in a case in which the bronchoscope 18 is connected to the endoscope processing device 56, for example, the first control unit 96B or the processor 110 may recognize the bronchoscope 18 connected to the endoscope processing device 56 from information stored in the bronchoscope 18 connected to the endoscope processing device 56 (for example, a unique identifier given to the bronchoscope 18). In this case, for example, the model name and outer diameter of the recognized bronchoscope 18 may be displayed. After checking the displayed content, the user may give an instruction of "OK" to the endoscope processing device 56 and/or to the server 68 through the receiving device 60.

The confirmation key 14B3 is a soft key that is turned on by the user in a case in which the user confirms the outer diameter α input to the outer diameter input region 14B2. The operation for the confirmation key 14B3 is implemented by the reception of an instruction from the user by the receiving device 60.

In a case in which the outer diameter α is received by the receiving device 60, the first control unit 96B displays the outer diameter α received by the receiving device 60 in the outer diameter input region 14B2. Then, in a case in which the confirmation key 14B3 is turned on with the outer diameter α displayed in the outer diameter input region 14B2, the first control unit 96B generates outer diameter information 152 indicating the outer diameter α displayed in the outer diameter input region 14B2. The first transmitting and receiving unit 96A transmits the outer diameter information 152 generated by the first control unit 96B to the server 68. In the server 68, the second transmitting and receiving unit 110A receives the outer diameter information 152 transmitted by the first transmitting and receiving unit 96A.

Figure 13:
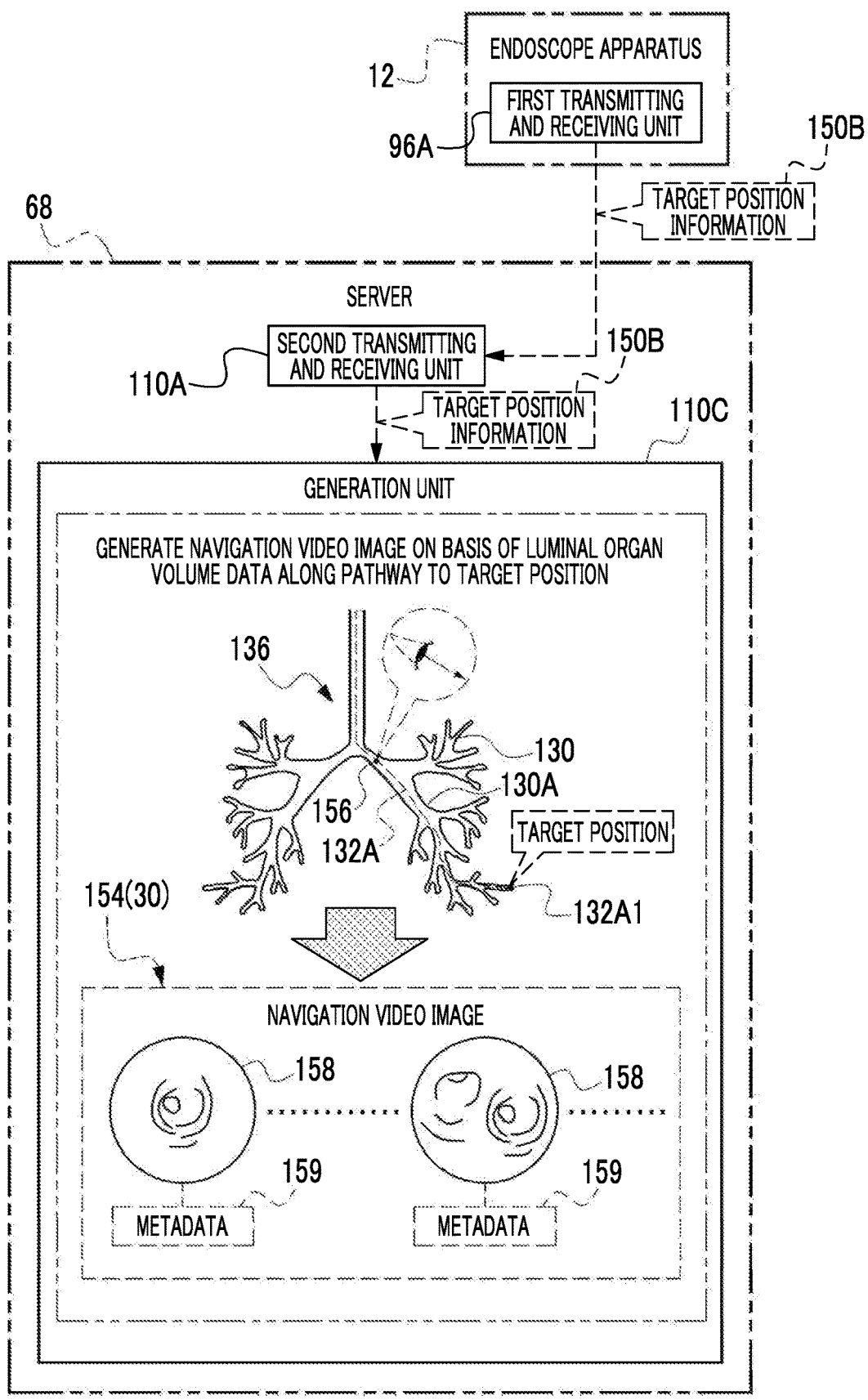
FIG. 13 is a conceptual diagram illustrating an example of content of a process of a generation unit in a case in which target position information is received by a second transmitting and receiving unit.

For example, as illustrated in FIG. 13, in the server 68, the generation unit 110C generates a navigation video image 154 on the basis of the target position information 150B received by the second transmitting and receiving unit 110A and the luminal organ volume data 136 with a pathway stored in the NVM 114.

Here, a specific example of a method for generating the navigation video image 154 will be described. First, the generation unit 110C selects a luminal organ pathway 132A corresponding to the target position information 150B from the plurality of luminal organ pathways 132 (see FIG. 9) with reference to the target position information 150B. The luminal organ pathway 132A is one luminal organ pathway 132 which has a target position 132A1 specified from the target position information 150B among the plurality of luminal organ pathways 132. That is, the luminal organ pathway 132A is a luminal organ pathway 132 including the target position information 150B (that is, three-dimensional coordinates that specify the target position 148 (see FIG. 11) selected by the user) among the plurality of luminal organ pathways 132.

Then, the generation unit 110C generates the navigation video image 154 on the basis of the luminal organ volume data 130 along the luminal organ pathway 132A up to the target position 132A1. The luminal organ volume data 130 along the luminal organ pathway 132A up to the target position 132A1 means luminal organ volume data 130 indicating the virtual luminal organ 130A through which the luminal organ pathway 132A passes (that is, a portion, which has been subjected to the thinning process for generating the luminal organ pathway 132A, in the luminal organ volume data 130).

The navigation video image 154 is an example of the virtual image 30 illustrated in FIG. 1. The navigation video image 154 is a video image showing an aspect in which the back side in the virtual luminal organ 130A is observed from a virtual viewpoint 156 provided on the luminal organ pathway 132A in the virtual luminal organ 130A indicated by the luminal organ volume data 130 (that is, a termination direction of the luminal organ pathway 132A). That is, the navigation video image 154 is a video image showing an aspect in which the viewpoint 156 advances in the virtual luminal organ 130A along the luminal organ pathway 132A. In other words, the viewpoint 156 is a virtual endoscope corresponding to the camera 44 in the distal end part 36 of the bronchoscope 18. While the camera 44 is a physical camera, the virtual endoscope is a virtual camera. In addition, the viewpoint 156 is an example of a "virtual endoscope corresponding to a bronchoscope" according to the technology of the present disclosure.

The navigation video image 154 includes a plurality of frames 158 obtained according to a predetermined frame rate from a starting point to an end point of the luminal organ pathway 132A. The frame 158 is a single image. The plurality of frames 158 are arranged in a time series along the direction in which the viewpoint 156 advances (that is, the termination direction of the luminal organ pathway 132A). Further, metadata 159 is given to each frame 158. The metadata 159 includes, for example, three-dimensional coordinates capable of specifying which position of the luminal organ pathway 132A each frame 158 corresponds to and a frame identifier which is an identifier capable of specifying the frame 158. In addition, the metadata 159 of the frame 158 corresponding to the position of a branch in the virtual luminal organ 130A includes a branch identifier which is an identifier capable of specifying the branch in the virtual luminal organ 130A. The plurality of frames 158 are an example of "a plurality of images" according to the technology of the present disclosure. In addition, the viewpoint 156 is an example of a "virtual endoscope" according to the technology of the present disclosure.

Figure 14:
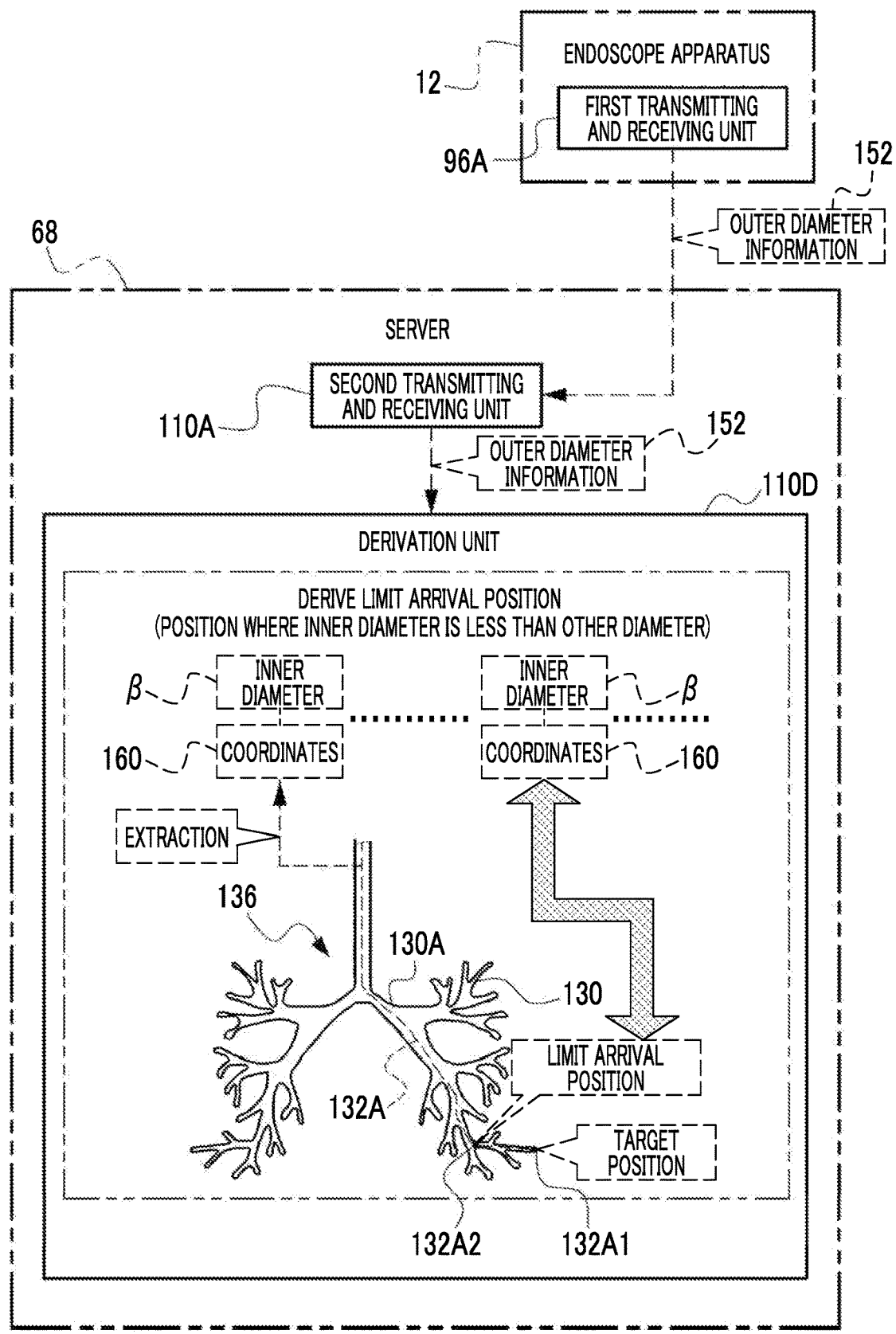
FIG. 14 is a conceptual diagram illustrating an example of content of a process of a derivation unit in a case in which outer diameter information is received by the second transmitting and receiving unit.

For example, as illustrated in FIG. 14, in the server 68, the derivation unit 110D derives a limit arrival position 132A2 on the basis of the outer diameter α (see FIG. 12) indicated by the outer diameter information 152 received by the second transmitting and receiving unit 110A and an inner diameter β of the virtual luminal organ 130A through which the luminal organ pathway 132A passes. The limit arrival position 132A2 means a position which the bronchoscope 18 (for example, the distal end part 36 of the bronchoscope 18) can reach in the bronchus 86. In addition, the derivation of the limit arrival position 132A2 means obtaining the inner diameter β and coordinates 160 of the limit arrival position 132A2 from the luminal organ volume data 130 along the luminal organ pathway 132A up to the target position 132A1. The limit arrival position 132A2 is an example of an "arrival position" and a "limit position" according to the technology of the present disclosure.

Here, a specific example of a method for deriving the limit arrival position 132A2 will be described. First, the derivation unit 110D derives the inner diameter β of the virtual luminal organ 130A at a predetermined interval (for example, at an interval of several pixels to several tens of pixels) along the luminal organ pathway 132A on the basis of the luminal organ volume data 130 indicating the virtual luminal organ 130A through which the luminal organ pathway 132A passes. In addition, the derivation unit 110D acquires three-dimensional coordinates capable of specifying the position of the inner diameter β as the coordinates 160 from the luminal organ volume data 130 and stores the acquired coordinates 160 and the corresponding inner diameter β in association with each other. Then, the derivation unit 110D compares a plurality of inner diameters β and outer diameters α on the luminal organ pathway 132A to derive a position where the inner diameter β is less than the outer diameter α as the limit arrival position 132A2. That is, the derivation unit 110D derives a position on a most upstream side where the magnitude relationship of "the inner diameter β<the outer diameter α" is established in the luminal organ pathway 132A as the limit arrival position 132A2.

In a case in which the derivation unit 110D derives the limit arrival position 132A2 as described above, for example, as illustrated in FIG. 15, the derivation unit 110D generates arrival position specification information 162 that can specify the limit arrival position 132A2. The arrival position specification information 162 includes the inner diameter β of the limit arrival position 132A2 and the corresponding coordinates 160.

The generation unit 110C generates limit arrival-related information 164, which is information related to the limit arrival position 132A2, on the basis of the arrival position specification information 162 generated by the derivation unit 110D. The limit arrival-related information 164 is an example of "arrival position-related information" according to the technology of the present disclosure.

The generation unit 110C generates a predetermined number of composite images 158A on the basis of the generated limit arrival-related information 164 and a predetermined number of frames 158 (for example, the number of frames 158 designated within a range of tens to hundreds of frames) determined on the basis of the frame 158 corresponding to the limit arrival-related information 164 among a plurality of frames 158 included in the navigation video image 154.

The predetermined number of frames 158 means a plurality of frames 158 obtained within a period which corresponds to a predetermined number of frames including the frame 158 corresponding to the limit arrival position 132A2 specified from the coordinates 160 included in the limit arrival-related information 164. The generation unit 110C specifies a predetermined number of frames 158 on the basis of the metadata 159 (see FIG. 13) of each frame 158 and the arrival position specification information 162. The predetermined number of frames may be a fixed value determined according to, for example, a frame rate or may be a variable value changed according to, for example, the instruction received by the receiving device 60 or 74 and/or imaging conditions. The predetermined number of composite images 158A is generated by superimposing the limit arrival-related information 164 on each of the predetermined number of frames 158.

The limit arrival-related information 164 includes a colored mark 164A, an alert message 164B, and a numerical value 164C. The colored mark 164A is a colored circular mark (for example, a translucent colored circular mark) that covers a hole portion of the virtual bronchus located at the limit arrival position 132A2. The aspect (for example, the color and/or size) of the colored mark 164A is determined according to the position of the viewpoint 156 (see FIG. 13) and the inner diameter β of the limit arrival position 132A2.

The alert message 164B is a message that alerts the user. In the example illustrated in FIG. 15, a message "Caution for insertion" is illustrated. However, this is only an example. For example, the alert message 164B may be a message notifying that the limit arrival position 132A2 is included in the frame 158 or a message notifying that attention is required for the operation of the bronchoscope 18. The alert message 164B may be any message that alerts the user. The numerical value 164C is a numerical value indicating the inner diameter β of the limit arrival position 132A2.

The colored mark 164A is an example of "information capable of specifying the position of a part having an inner diameter" according to the technology of the present disclosure. In addition, the alert message 164B is an example of "first alert information" and "information indicating precautions in the part" according to the technology of the present disclosure.

As described above, in a case in which the generation unit 110C generates the navigation video image 154 including the predetermined number of composite images 158A, the second transmitting and receiving unit 110A transmits the generated navigation video image 154 to the endoscope apparatus 12. In the endoscope apparatus 12, the first transmitting and receiving unit 96A receives the navigation video image 154 transmitted from the second transmitting and receiving unit 110A.

Figure 16:
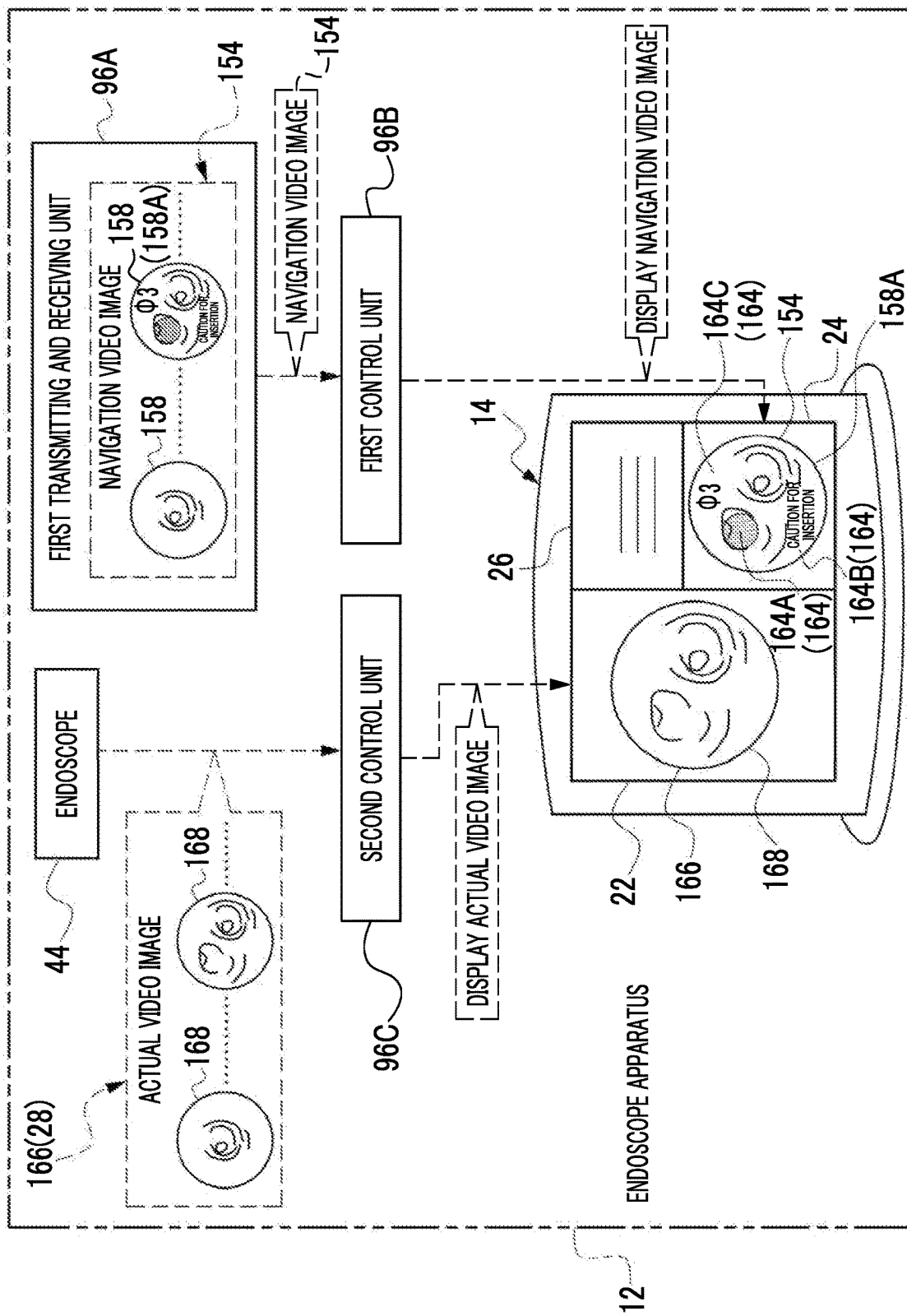
FIG. 16 is a conceptual diagram illustrating an example of content of processes of the first control unit and a second control unit.

For example, as illustrated in FIG. 16, in the endoscope apparatus 12, the second control unit 96C acquires an actual video image 166, which is an image of the subject (for example, the inside of the body) that is actually observed, from the camera 44. The actual video image 166 is an example of the endoscope image 28 illustrated in FIG. 1. The actual video image 166 is a video image (here, for example, a live view image) obtained by imaging the inside of the luminal organ 77 (see FIG. 3) along the route 88 (see FIG. 3) with the camera 44. The actual video image 166 includes a plurality of frames 168 obtained by performing imaging according to a predetermined frame rate from a starting point to an end point of the route 88. The frame 168 is a single image. The second control unit 96C outputs the plurality of frames 168 to the display device 14 in a time series to display the actual video image 166 on the first screen 22 of the display device 14.

In the endoscope apparatus 12, the first control unit 96B outputs the plurality of frames 158 included in the navigation video image 154 received by the first transmitting and receiving unit 96A to the display device 14 in a time series to display the navigation video image 154 on the second screen 24 of the display device 14.

In a case in which the viewpoint 156 (see FIG. 13) reaches a position determined on the basis of the limit arrival position 132A2 (for example, a position corresponding to the frame 158 that is a predetermined number of frames before the limit arrival position 132A2), the composite image 158A is displayed on the second screen 24. The display of the composite image 158A means that the limit arrival-related information 164 is displayed together with the frame 158. In addition, the display of the composite image 158A means that the frame 158 and the limit arrival-related information 164 are displayed to be comparable with each other.

Further, the speed at which the display of the navigation video image 154 is advanced is basically a constant speed unless an instruction from the user (for example, an instruction by the voice of the doctor 16) is received by the receiving device 60. An example of the constant speed is a speed that is calculated from the distance from the starting point to the end point of the luminal organ pathway 132A and a default time required for the viewpoint 156 to move from the starting point to the end point of the luminal organ pathway 132A.

In addition, the display aspect including the speed at which the display of the navigation video image 154 is advanced is changed on condition that the instruction from the user (for example, the instruction by the voice of the doctor 16) is received by the receiving device 60. For example, the speed at which the display of the navigation video image 154 is advanced is changed according to the instruction received by the receiving device 60. The change in the speed at which the display of the navigation video image 154 is advanced is implemented by, for example, so-called fast forward, frame-by-frame playback, and slow playback. Further, the display aspect of the navigation video image 154 returns to a default display aspect on condition that the instruction from the user is cancelled.

Next, the operation of the endoscope system 10 will be described with reference to FIGS. 17 to 19.

First, an example of a flow of an endoscope image display process performed by the processor 96 of the endoscope processing device 56 in a case in which the camera 44 is inserted into the luminal organ 77 of the subject 20 will be described with reference to FIG. 17. In addition, here, the description will be made on the premise that the camera 44 performs imaging at a predetermined frame rate along the route 88 (see FIG. 3) to acquire the actual video image 166 (see FIG. 16) as the live view image.

Figure 17:
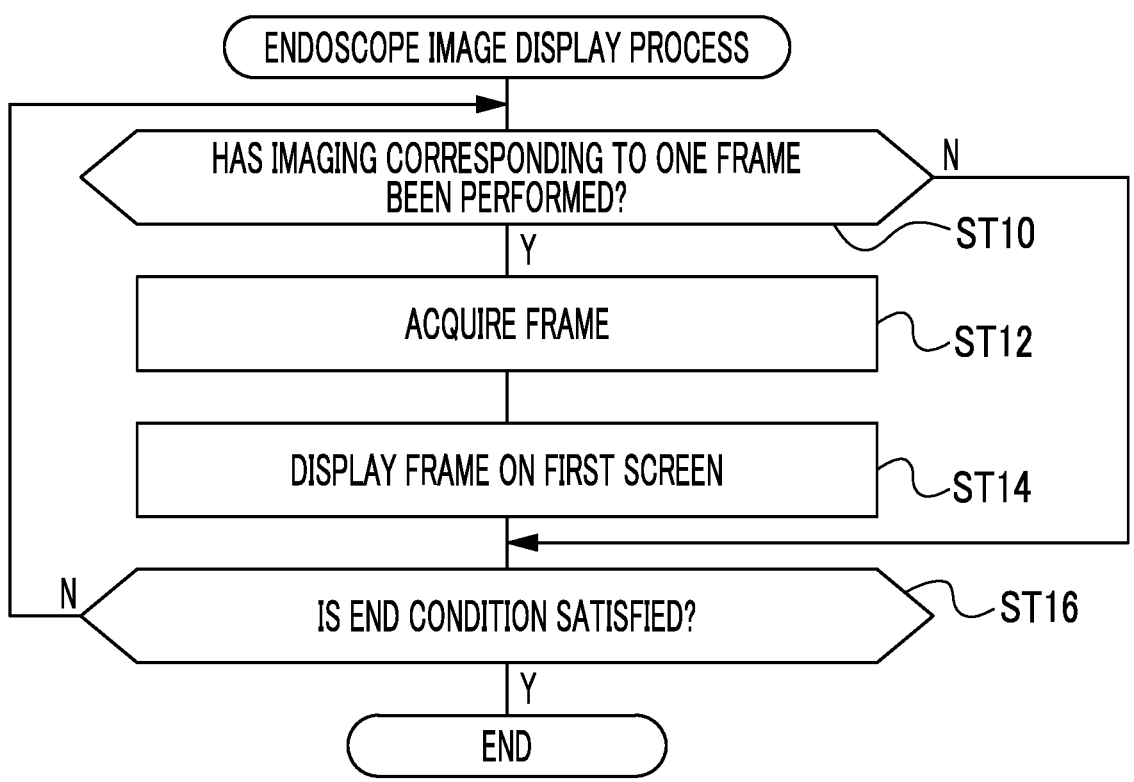
FIG. 17 is a flowchart illustrating an example of a flow of an endoscope image display process.

In the endoscope image display process illustrated in FIG. 17, first, in Step ST10, the second control unit 96C determines whether or not imaging corresponding to one frame has been performed by the camera 44. In a case in which the imaging corresponding to one frame has not been performed by the camera 44 in Step ST10, the determination result is "No", and the endoscope image display process proceeds to Step ST16. In a case in which the imaging corresponding to one frame has been performed by the camera 44 in Step ST10, the determination result is "Yes", and the endoscope image display process proceeds to Step ST12.

In Step ST12, the second control unit 96C acquires the frame 168 obtained by performing the imaging corresponding to one frame with the camera 44 (see FIG. 16). After the process in Step ST12 is performed, the endoscope image display process proceeds to Step ST14.

In Step ST14, the second control unit 96C displays the frame 168 acquired in Step ST12 on the first screen 22 (see FIG. 16). After the process in Step ST14 is performed, the endoscope image display process proceeds to Step ST16.

In Step ST16, the second control unit 96C determines whether or not a condition for ending the endoscope image display process (hereinafter, referred to as an "endoscope image display process end condition") has been satisfied. An example of the endoscope image display process end condition is a condition in which the receiving device 60 has received an instruction to end the endoscope image display process. In a case in which the endoscope image display process end condition has not been satisfied in Step ST16, the determination result is "No", and the endoscope image display process proceeds to Step ST10. In a case in which the endoscope image display process end condition has been satisfied in Step ST16, the determination result is "Yes", and the endoscope image display process ends.

Next, an example of a flow of the navigation video image display process performed by the processor 96 of the endoscope processing device 56 in a case in which an instruction to start the execution of the navigation video image display process is received by the receiving device 60 will be described with reference to FIG. 18.

In the navigation video image display process illustrated in FIG. 18, first, in Step ST20, the first transmitting and receiving unit 96A determines whether or not the image transmission request instruction 124 has been received by the receiving device 60. In Step ST20, in a case in which the image transmission request instruction 124 has not been received by the receiving device 60, the determination result is "No", and the determination in Step ST20 is performed again. In a case in which the image transmission request instruction 124 has been received by the receiving device 60 in Step ST20, the determination result is "Yes", and the navigation video image display process proceeds to Step ST22.

In Step ST22, the first transmitting and receiving unit 96A transmits the image transmission request instruction signal 126 indicating the image transmission request instruction 124 received by the receiving device 60 to the server 68. After the process in Step ST22 is performed, the navigation video image display process proceeds to Step ST24.

In a case in which the image transmission request instruction signal 126 is transmitted to the server 68 by performing the process in Step ST22, the second transmitting and receiving unit 110A of the server 68 transmits the luminal organ volume data 136 with a pathway to the endoscope apparatus 12 according to the transmission of the image transmission request instruction signal 126 (see FIG. 10 and Step ST54 in FIG. 19).

In Step ST24, the first transmitting and receiving unit 96A determines whether or not the luminal organ volume data 136 with a pathway transmitted from the second transmitting and receiving unit 110A of the server 68 has been received by the communication module 104 (see FIGS. 4 and 5). In a case in which the luminal organ volume data 136 with a pathway transmitted from the second transmitting and receiving unit 110A of the server 68 has not been received by the communication module 104 in Step ST24, the determination result is "No", and the determination in Step ST24 is performed again. In a case in which the luminal organ volume data 136 with a pathway transmitted from the second transmitting and receiving unit 110A of the server 68 has been received by the communication module 104 in Step ST24, the determination result is "Yes", and the navigation video image display process proceeds to Step ST26.

In Step ST26, the first control unit 96B generates the luminal organ image 138 with a pathway on the basis of the luminal organ volume data 136 with a pathway and displays the luminal organ image 138 with a pathway on the display device 14 (see FIG. 10). After the process in Step ST26 is performed, the navigation video image display process proceeds to Step ST28.

In Step ST28, the first control unit 96B determines whether or not the target position selection instruction 146 (see FIG. 11) has been received by the receiving device 60. In a case in which the target position selection instruction 146 has not been received by the receiving device 60 in Step ST28, the determination result is "No", and the determination in Step ST28 is performed again. In a case in which the target position selection instruction 146 has been received by the receiving device 60 in Step ST28, the determination result is "Yes", and the navigation video image display process proceeds to Step ST30.

In Step ST30, the first control unit 96B displays the guidance screen 14B (see FIG. 12) on the display device 14. After the process in Step ST30 is performed, the navigation video image display process proceeds to Step ST32.

In Step ST32, the first control unit 96B determines whether or not the outer diameter α (see FIG. 12) has been received by the receiving device 60. In a case in which the outer diameter α has not been received by the receiving device 60 in Step ST32, the determination result is "No", and the determination in Step ST32 is performed again. In a case in which the outer diameter α has been received by the receiving device 60 in Step ST32, the determination result is "Yes", and the navigation video image display process proceeds to Step ST34.

In Step ST34, the first control unit 96B generates the target position information 150B corresponding to the target position selection instruction 146 received by the receiving device 60 (see FIG. 11). In addition, the first control unit 96B generates the outer diameter information 152 indicating the outer diameter α received by the receiving device 60 (see FIG. 12). Then, the first control unit 96B transmits the target position information 150B and the outer diameter information 152 to the server 68 (see FIGS. 11 and 12). After the process in Step ST34 is performed, the navigation video image display process proceeds to Step ST36.

Figure 15:
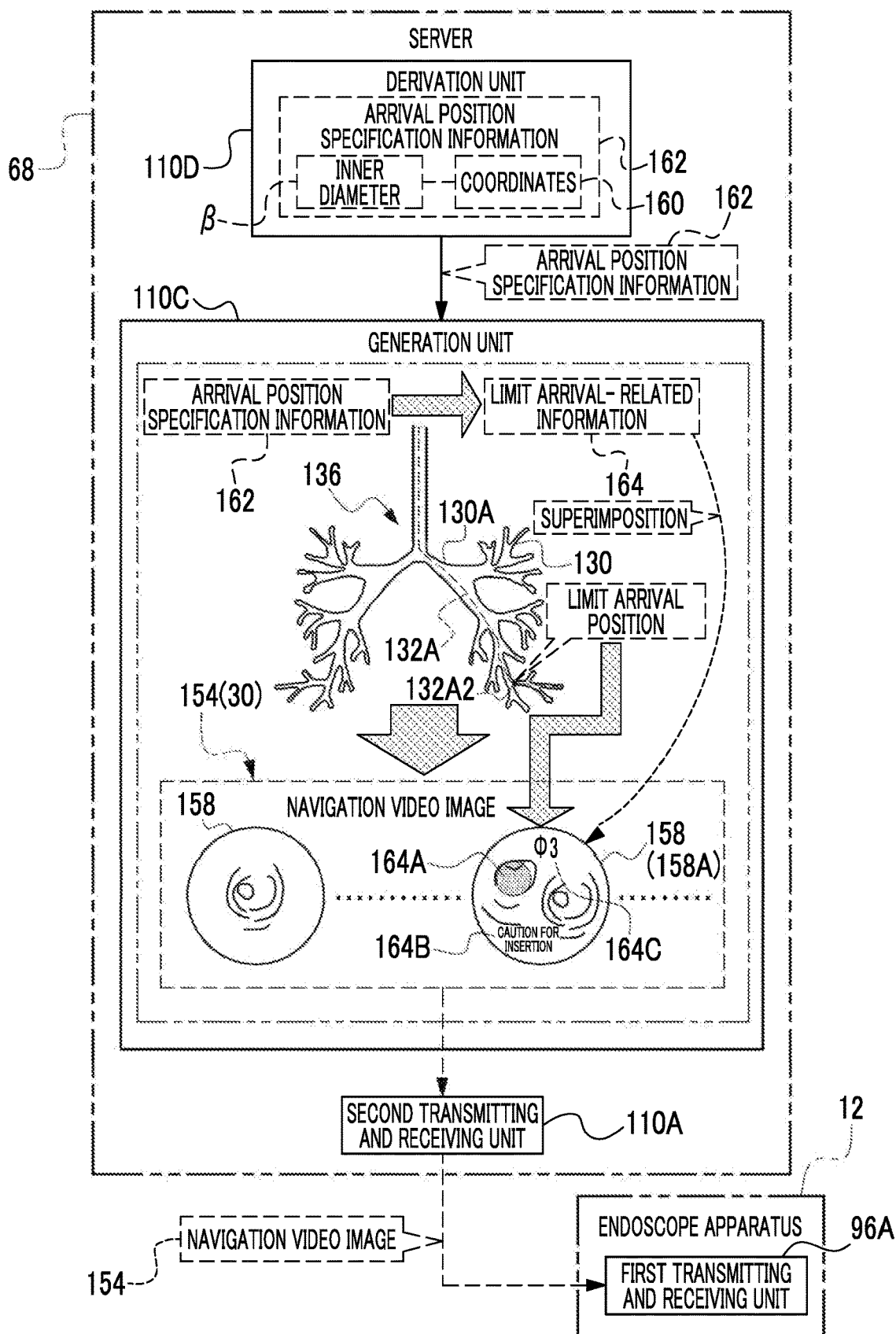
FIG. 15 is a conceptual diagram illustrating an example of the content of the process of the generation unit in a case in which the derivation unit derives arrival position specification information.

In a case in which the target position information 150B and the outer diameter information 152 are transmitted to the server 68 by performing the process in Step ST34, the generation unit 110C of the server 68 generates the navigation video image 154 accordingly, and the second transmitting and receiving unit 110A transmits the navigation video image 154 to the endoscope apparatus 12 (see FIG. 15 and Step ST64 in FIG. 19).

In Step ST36, the first transmitting and receiving unit 96A determines whether or not the navigation video image 154 transmitted from the second transmitting and receiving unit 110A of the server 68 has been received by the communication module 104 (see FIGS. 4 and 5). In a case in which the navigation video image 154 transmitted from the second transmitting and receiving unit 110A of the server 68 has not been received by the communication module 104 in Step ST36, the determination result is "No", and the determination in Step ST36 is performed again. In a case in which the navigation video image 154 transmitted from the second transmitting and receiving unit 110A of the server 68 has been received by the communication module 104 in Step ST36, the determination result is "Yes", and the navigation video image display process proceeds to Step ST38.

In Step ST38, the first control unit 96B displays the navigation video image 154 on the display device 14 (see FIG. 16). After the process in Step ST38 is performed, the navigation video image display process ends.

Next, an example of a flow of the image generation process performed by the processor 110 of the server 68 in a case in which an instruction to start the execution of the image generation process is received by the receiving device 60 or 74 will be described with reference to FIG. 19. The flow of the image generation process illustrated in FIG. 19 is an example of an "information processing method" according to the technology of the present disclosure.

In the image generation process illustrated in FIG. 19, first, in Step ST50, the second transmitting and receiving unit 110A determines whether or not the image transmission request instruction signal 126 transmitted from the first transmitting and receiving unit 96A by the execution of the process in Step ST22 illustrated in FIG. 18 has been received by the communication module 108 (see FIG. 5). In a case in which the image transmission request instruction signal 126 has not been received by the communication module 108 in Step ST50, the determination result is "No", and the determination in Step ST50 is performed again. In a case in which the image transmission request instruction signal 126 has been received by the communication module 108 in Step ST50, the determination result is "Yes", and the image generation process proceeds to Step ST52.

In Step ST52, the image processing unit 110B extracts the luminal organ volume data 130 from the volume data 128 (see FIG. 9). After the process in Step ST52 is performed, the image generation process proceeds to Step ST54.

In Step ST54, the image processing unit 110B generates the luminal organ volume data 136 with a pathway on the basis of the luminal organ volume data 130 extracted from the volume data 128 in Step ST52 (see FIG. 9). Then, the second transmitting and receiving unit 110A transmits the luminal organ volume data 136 with a pathway generated by the image processing unit 110B to the endoscope apparatus 12 (see FIG. 10). After the process in Step ST54 is performed, the image generation process proceeds to Step ST56.

In Step ST56, the second transmitting and receiving unit 110A determines whether or not the target position information 150B and the outer diameter information 152 transmitted from the first transmitting and receiving unit 96A by the execution of the process in Step ST34 illustrated in FIG. 18 have been received by the communication module 108 (see FIG. 5). In a case in which the target position information 150B and the outer diameter information 152 have not been received by the communication module 108 in Step ST56, the determination result is "No", and the determination in Step ST56 is performed again. In a case in which the target position information 150B and the outer diameter information 152 have been received by the communication module 108 in Step ST56, the determination result is "Yes", and the image generation process proceeds to Step ST58.

In Step ST58, the derivation unit 110D selects the luminal organ pathway 132A corresponding to the target position information 150B from a plurality of luminal organ pathways 132 (see FIG. 9) with reference to the target position information 150B. Then, the derivation unit 110D derives the inner diameter β of the virtual luminal organ 130A at a predetermined interval (for example, an interval of several pixels to several tens of pixels) along the luminal organ pathway 132A on the basis of the luminal organ volume data 130 indicating the virtual luminal organ 130A through which the luminal organ pathway 132A passes. After the process in Step ST58 is performed, the image generation process proceeds to Step ST60.

In Step ST60, the derivation unit 110D derives the limit arrival position 132A2 on the basis of the inner diameter β and the outer diameter α indicated by the outer diameter information 152. After the process in Step ST60 is performed, the image generation process proceeds to Step ST62.

In Step ST62, the generation unit 110C generates the navigation video image 154 on the basis of the arrival position specification information 162 including the inner diameter β and the coordinates 160 of the limit arrival position 132A2 derived in Step ST60 and the luminal organ volume data 130 indicating the virtual luminal organ 130A through which the luminal organ pathway 132A passes (see FIG. 15). The navigation video image 154 includes a predetermined number of composite images 158A. The composite image 158A is an image obtained by superimposing the limit arrival-related information 164 generated on the basis of the arrival position specification information 162 on the frame 158 (see FIG. 15). After the process in Step ST62 is performed, the image generation process proceeds to Step ST64.

In Step ST64, the second transmitting and receiving unit 110A transmits the navigation video image 154 generated in Step ST62 to the endoscope apparatus 12 (see FIG. 15). Then, the first transmitting and receiving unit 96A of the endoscope apparatus 12 receives the navigation video image 154 (see FIG. 15), and the first control unit 96B displays the navigation video image 154 on the second screen 24 (see FIG. 16 and Step ST36 in FIG. 18). After the process in Step ST64 is performed, the image generation process ends.

As described above, in the endoscope system 10, the inner diameter β of the virtual luminal organ 130A is derived at a predetermined interval along the luminal organ pathway 132A on the basis of the luminal organ volume data 130 indicating the virtual luminal organ 130A through which the luminal organ pathway 132A passes. Then, the limit arrival position 132A2 (see FIG. 14) is derived on the basis of the inner diameter β and the outer diameter α of the insertion portion 34 of the bronchoscope 18 inserted into the bronchus 86. Therefore, it is possible to support the operation of inserting the bronchoscope 18 (for example, the distal end part 36) to reach the predetermined position 90 (for example, the position determined on the basis of the limit arrival position 132A2) in the bronchus 86.

In addition, the limit arrival position 132A2 is a position where the magnitude relationship of "the inner diameter β<the outer diameter α" is established on the luminal organ pathway 132A in the virtual luminal organ 130A. Therefore, it is possible to support the operation of inserting the bronchoscope 18 to reach the position (for example, the position 90 illustrated in FIG. 3) determined on the basis of the position that the distal end part 36 of the bronchoscope 18 can reach (for example, the limit position where the distal end part 36 of the bronchoscope 18 can be inserted in the bronchus 86). In addition, a position where the distal end part 36 of the bronchoscope 18 can be physically inserted in the bronchus 86 can be specified as the limit position.

Further, the luminal organ pathway 132A is the shortest pathway to the target position 132A1, and the limit arrival position 132A2 is a position on the luminal organ pathway 132A. Therefore, it is possible to support the operation of inserting the bronchoscope 18 to reach the predetermined position 90 (for example, the position determined on the basis of the limit arrival position 132A2) on the shortest pathway to the target position (for example, a position corresponding to the position of the periphery of the bronchus 86) in the luminal organ 77.

Further, the target position 148 is determined according to the target position selection instruction 146 received by the receiving device 60. Therefore, it is possible to support the operation of inserting the bronchoscope 18 to reach the predetermined position 90 (for example, the position determined on the basis of the limit arrival position 132A2) on the shortest pathway to the position intended by the user as the target position in the luminal organ 77.

In addition, the navigation video image 154 including a predetermined number of frames 158 on which the limit arrival-related information 164 has been superimposed is displayed on the second screen 24 (see FIG. 16). The limit arrival-related information 164 is information related to the limit arrival position 132A2. Therefore, it is possible to make the user ascertain the information related to the limit arrival position 132A2.

In addition, the limit arrival-related information 164 includes the alert message 164B (see FIG. 16). The alert message 164B is a message that alerts the user. Therefore, it is possible to make the user perceive that the bronchoscope 18 has reached the predetermined position 90 (for example, the position determined on the basis of the limit arrival position 132A2) in the bronchus 86.

In addition, the actual video image 166 is displayed on the first screen 22, and the navigation video image 154 including a predetermined number of composite images 158A is displayed on the second screen 24. That is, the actual video image 166 and the navigation video image 154 including a predetermined number of composite images 158A are displayed on the display device 14 to be comparable with each other (see FIG. 16). Therefore, it is possible to guide the operation of inserting the bronchoscope 18 to reach the predetermined position 90 (for example, the position determined on the basis of the limit arrival position 132A2) in the bronchus 86.

In addition, in a case in which the frame 158 (for example, the frame 158 before a predetermined number of frames including the frame 158 corresponding to the limit arrival position 132A2) indicating the aspect of the designated position in the virtual luminal organ 130A through which the luminal organ pathway 132A passes is displayed on the second screen 24, the limit arrival-related information 164 is displayed on the second screen 24. Therefore, in a case in which the viewpoint 156 reaches a designated position (for example, a position corresponding to the position 90 illustrated in FIG. 3) in the virtual luminal organ 130A through which the luminal organ pathway 132A passes, it is possible to make the user ascertain information related to the limit arrival position 132A2.

In addition, the designated position in the virtual luminal organ 130A through which the luminal organ pathway 132A passes may be a position selected according to the instruction received by the receiving device 60 or 74. This makes it possible to make the user ascertain the information related to the limit arrival position 132A2 in a case in which the viewpoint 156 reaches the position selected according to the instruction received by the receiving device 60 or 74 (for example, the position corresponding to the position 90 illustrated in FIG. 3).

Further, the designated position in the virtual luminal organ 130A through which the luminal organ pathway 132A passes may be a position determined on the basis of the limit arrival position 132A2. In this case, it is possible to make the user ascertain the information related to the limit arrival position 132A2 in a case in which the viewpoint 156 reaches the position determined on the basis of the limit arrival position 132A2 (for example, the position corresponding to the position 90 illustrated in FIG. 3).

Furthermore, in the above-described embodiment, the position where the magnitude relationship of "the inner diameter β<the outer diameter α" is established is set as the limit arrival position 132A2. However, the technology of the present disclosure is not limited thereto. For example, a position where a diameter determined on the basis of the inner diameter β is less than the outer diameter α may be set as the limit arrival position 132A2. The diameter determined on the basis of the inner diameter β means, for example, a diameter obtained by multiplying the inner diameter β by a first coefficient. An example of the first coefficient is a coefficient (for example, 1.25) greater than "1". The first coefficient may be a predetermined fixed value or a variable value which is changed according to, for example, the instruction received by the receiving device 60 or 74 and/or the features of the luminal organ 77 of each subject 20 (for example, a position where a cartilage is present).

Furthermore, for example, a position where the inner diameter β is less than a diameter determined on the basis of the outer diameter α may be set as the limit arrival position 132A2. The diameter determined on the basis of the outer diameter α means, for example, a diameter obtained by multiplying the outer diameter α by a second coefficient. An example of the second coefficient is a coefficient (for example, 0.85) less than "1". The second coefficient may be a predetermined fixed value or a variable value which is changed according to, for example, the instruction received by the receiving device 60 or 74 and/or a material forming the insertion portion 34.

Moreover, for example, a position where the diameter determined on the basis of the inner diameter β is less than the diameter determined on the basis of the outer diameter α may be set as the limit arrival position 132A2.

First Modification Example

In the above-described embodiment, the aspect in which the limit arrival position 132A2 is derived for one target position 132A1 has been described. However, the technology of the present disclosure is not limited to this aspect. For example, in a case in which a plurality of target positions 132A1 are present, the limit arrival position 132A2 may be derived for each of the target positions 132A1.

Figure 20:
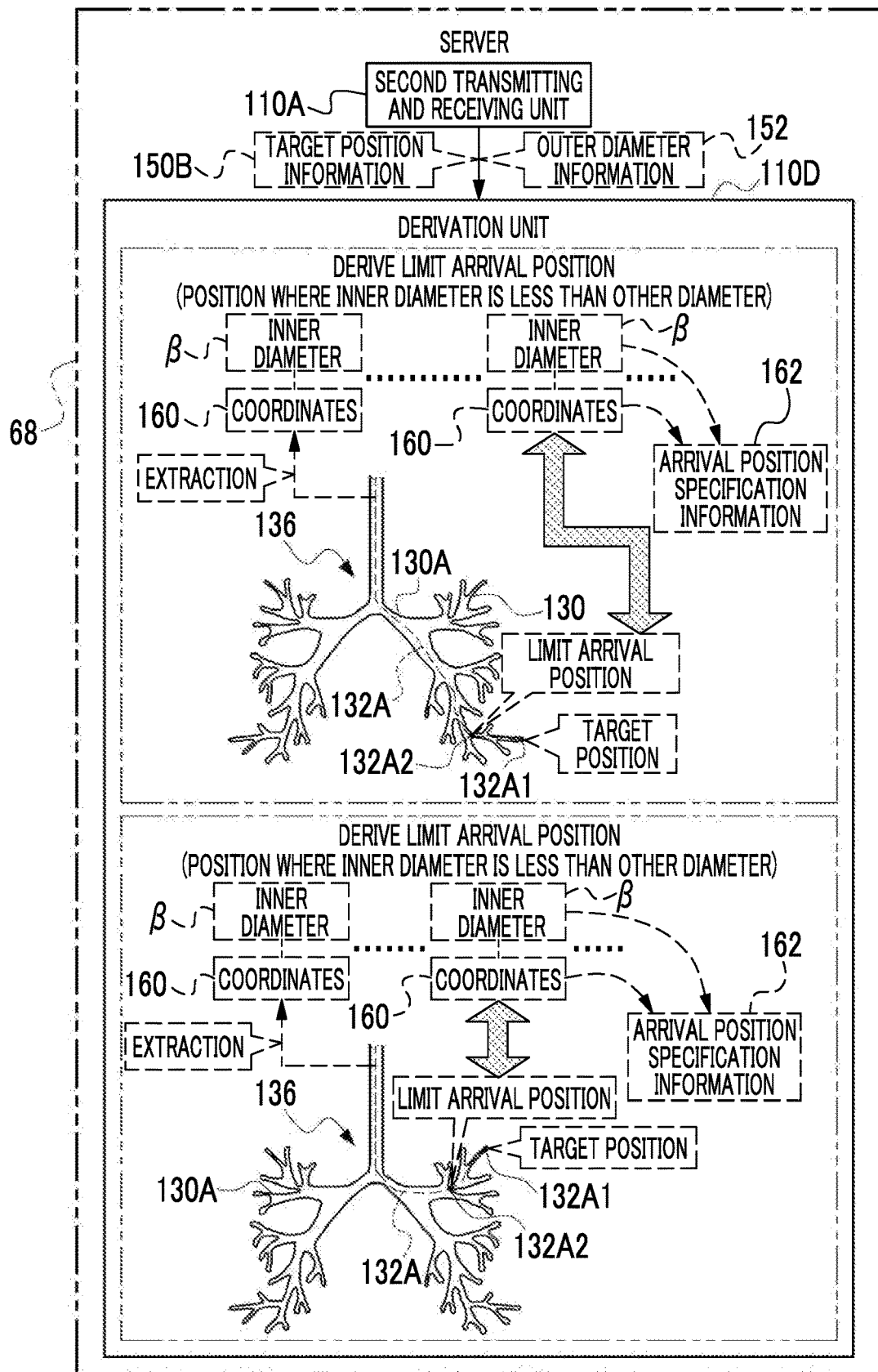
FIG. 20 is a conceptual diagram illustrating an example of content of a process of a derivation unit in a server according to a first modification example.

In this case, for example, as illustrated in FIG. 20, the derivation unit 110D selects a luminal organ pathway 132A corresponding to the target position information 150B from a plurality of luminal organ pathways 132 (see FIG. 9) for each of a plurality of target positions 132A1 (in the example illustrated in FIG. 20, two target positions 132A1) with reference to the target position information 150B. The derivation unit 110D derives the limit arrival position 132A2 for each of the luminal organ pathways 132A on the basis of the outer diameter α (see FIG. 12) indicated by the outer diameter information 152 and the inner diameter β of the virtual luminal organ 130A through which the luminal organ pathway 132A passes. In addition, the derivation unit 110D generates the arrival position specification information 162 for each of the luminal organ pathways 132A.

The navigation video image 154 is generated for each luminal organ pathway 132A in the manner described in the above-described embodiment. Then, the limit arrival-related information 164 is generated for each luminal organ pathway 132A on the basis of the limit arrival position 132A2 and is superimposed on a predetermined number of frames 158 included in the corresponding navigation video image 154 to generate a predetermined number of composite images 158A in the manner described in the above-described embodiment. The navigation video image 154 is displayed on the second screen 24 in units of the luminal organ pathways 132A. That is, this means that a predetermined number of composite images 158A are displayed on the second screen 24 in units of the luminal organ pathways 132A.

As described above, the limit arrival position 132A2 is derived for each of the plurality of target positions 132A1, which makes it possible to support the operation of inserting the bronchoscope 18 to reach each predetermined position (for example, each position determined on the basis of each of the limit arrival positions 132A2) on each of the shortest pathways to the plurality of target positions in the luminal organ 77.

In addition, the plurality of target positions 132A1 may be determined according to the target position selection instruction 146 received by the receiving device 60. In this case, it is possible to support the operation of inserting the bronchoscope 18 to reach each predetermined position (for example, each position determined on the basis of each of the limit arrival positions 132A2) on each of the shortest pathways to a plurality of positions intended by the user as the plurality of target positions in the luminal organ 77.

Second Modification Example

In the above-described embodiment, the aspect (see FIG. 11) in which the user selects the target position 148 from the luminal organ image 138 with a pathway displayed on the screen 14A has been described. However, the technology of the present disclosure is not limited to this aspect. For example, together with the luminal organ image 138 with a pathway, a plurality of target position candidates added to the luminal organ image 138 with a pathway may be displayed on the screen 14A, and at least one target position candidate selected from the plurality of target position candidates according to the instruction (for example, the target position selection instruction 146) received by the receiving device 60 may be set as the target position 148.

Figure 21:
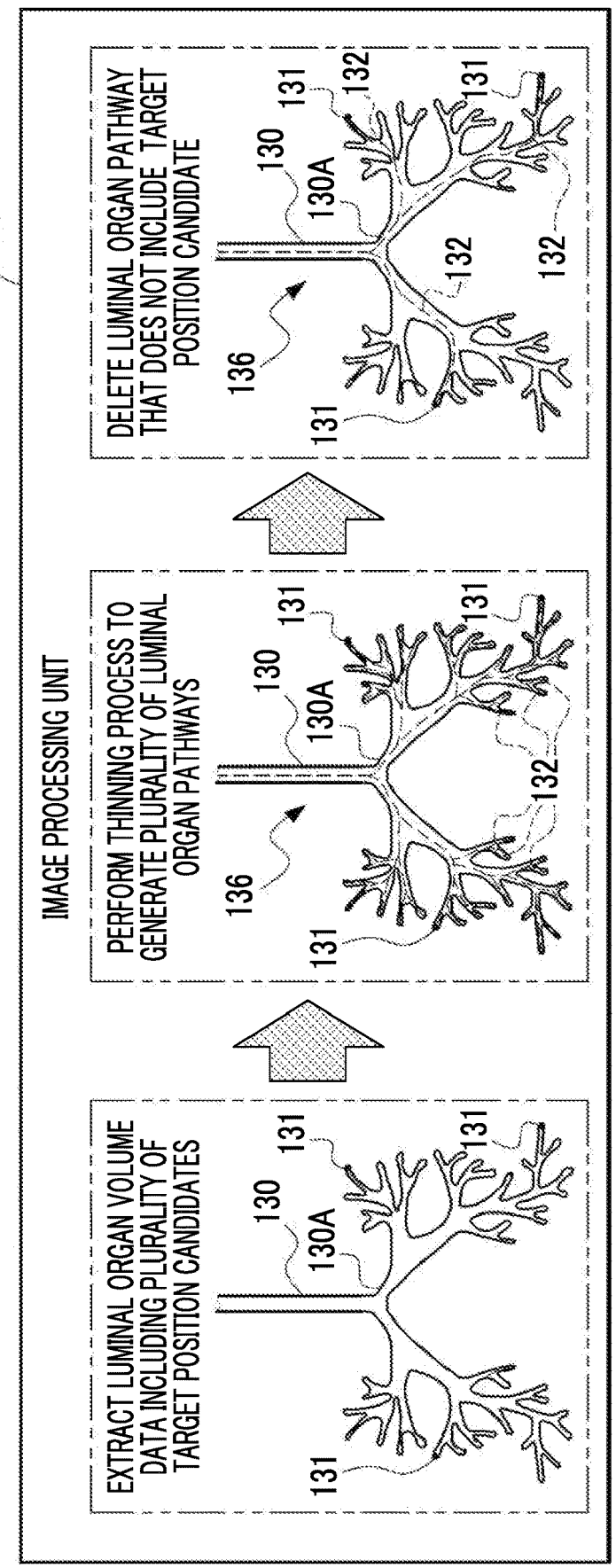
FIG. 21 is a conceptual diagram illustrating an example of content of a process of an image processing unit in a server according to a second modification example.

For example, as illustrated in FIG. 21, first, the image processing unit 110B extracts the luminal organ volume data 136 including a plurality of target position candidates 131 from the volume data 128 (see FIG. 9) in order to display the plurality of target position candidates together with the luminal organ image 138 with a pathway on the screen 14A. An example of the target position candidate 131 is a lesion (for example, a tumor). The plurality of target position candidates 131 may be derived by performing an image recognition process using an AI method or a template matching method on the volume data 128, or a plurality of portions designated in advance as lesions from the preliminary examination results may be derived as the plurality of target position candidates 131 from the volume data 128.

Then, the image processing unit 110B performs the thinning process on the luminal organ volume data 136 including the plurality of target position candidates 131 to generate a plurality of luminal organ pathways 132. The image processing unit 110B deletes the luminal organ pathway 132 that does not include the target position candidate 131 from the plurality of generated luminal organ pathways 132. The luminal organ volume data 136 obtained in this way is rendered to generate the luminal organ image 138 with a pathway to which the plurality of target position candidates and the plurality of luminal organ pathways 132 corresponding to the plurality of target position candidates have been added. The luminal organ image 138 with a pathway is displayed on the screen 14A. Then, at least one target position candidate selected from the plurality of target position candidates displayed on the screen 14A according to the instruction received by the receiving device 60 (for example, the target position selection instruction 146) is set as the target position 148. This makes it possible to support the operation of inserting the bronchoscope 18 to reach a predetermined position (for example, a position determined on the basis of the limit arrival position 132A2) on each shortest pathway to the position intended by the user as the target position in the luminal organ 77.

Third Modification Example

In the above-described embodiment, the aspect in which the limit arrival position 132A2 is derived on the basis of the outer diameter α received by the receiving device 60 has been described. However, the technology of the present disclosure is not limited to this aspect. For example, in a case in which a plurality of bronchoscopes 18 are present, the limit arrival position 132A2 may be derived for each of the bronchoscopes 18.

Figure 22:
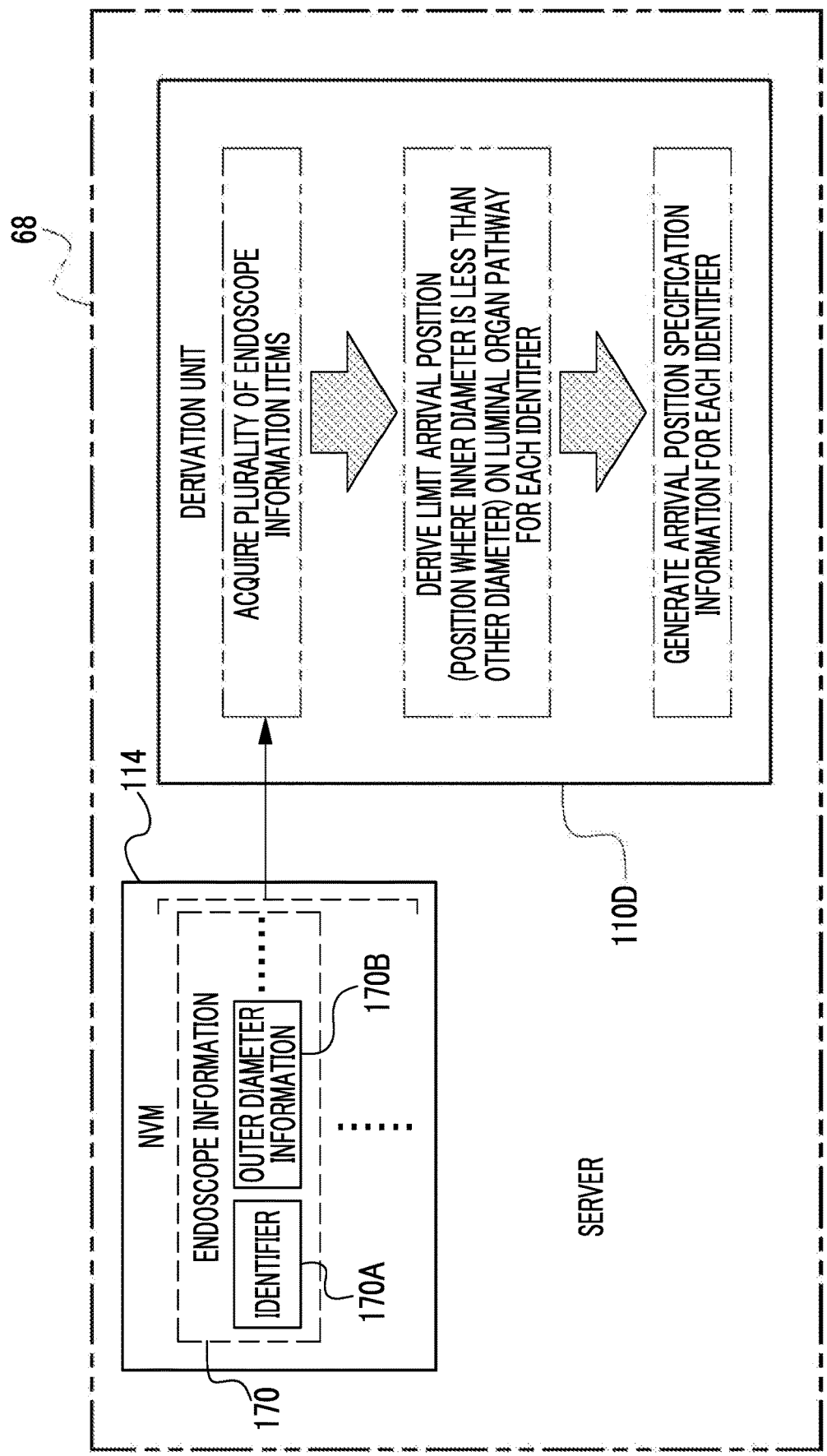
FIG. 22 is a conceptual diagram illustrating an example of content of a process of a derivation unit in a server according to a third modification example.

In this case, for example, as illustrated in FIG. 22, a plurality of endoscope information items 170 are stored in the NVM 114. The plurality of endoscope information items 170 are information related to the plurality of bronchoscopes 18. The endoscope information 170 includes, for example, an identifier 170A that can specify the bronchoscope 18 and outer diameter information 170B indicating the outer diameter α of the bronchoscope 18.

The derivation unit 110D acquires the plurality of endoscope information items 170 from the NVM 114 and extracts the identifier 170A and the outer diameter information 170B from each of the plurality of acquired endoscope information items 170. The derivation unit 110D derives the limit arrival position 132A2 on the luminal organ pathway 132A for each identifier 170A on the basis of the outer diameter α indicated by the outer diameter information 170B and a plurality of inner diameters β acquired in the same manner as in the above-described embodiment. Then, the derivation unit 110D generates the arrival position specification information 162 for each identifier 170A on the basis of the limit arrival position 132A2 in the same manner as in the above-described embodiment.

As described above, in a case in which a plurality of bronchoscopes 18 are present, the limit arrival position 132A2 is derived for each of the bronchoscopes 18, which makes it possible to support the operation of inserting the bronchoscope 18 (for example, the insertion portion 34) to reach the predetermined position 90 (for example, the position determined on the basis of the limit arrival position 132A2) in the bronchus 86 for each of the bronchoscopes 18.

Fourth Modification Example

In the third modification example, the aspect in which the limit arrival position 132A2 is derived for each of the plurality of bronchoscopes 18 has been described. However, the technology of the present disclosure is not limited to this aspect. For example, the limit arrival position 132A2 may be derived for a bronchoscope 18 selected from the plurality of bronchoscopes 18 according to the instruction received by the receiving device 60.

Figure 23:
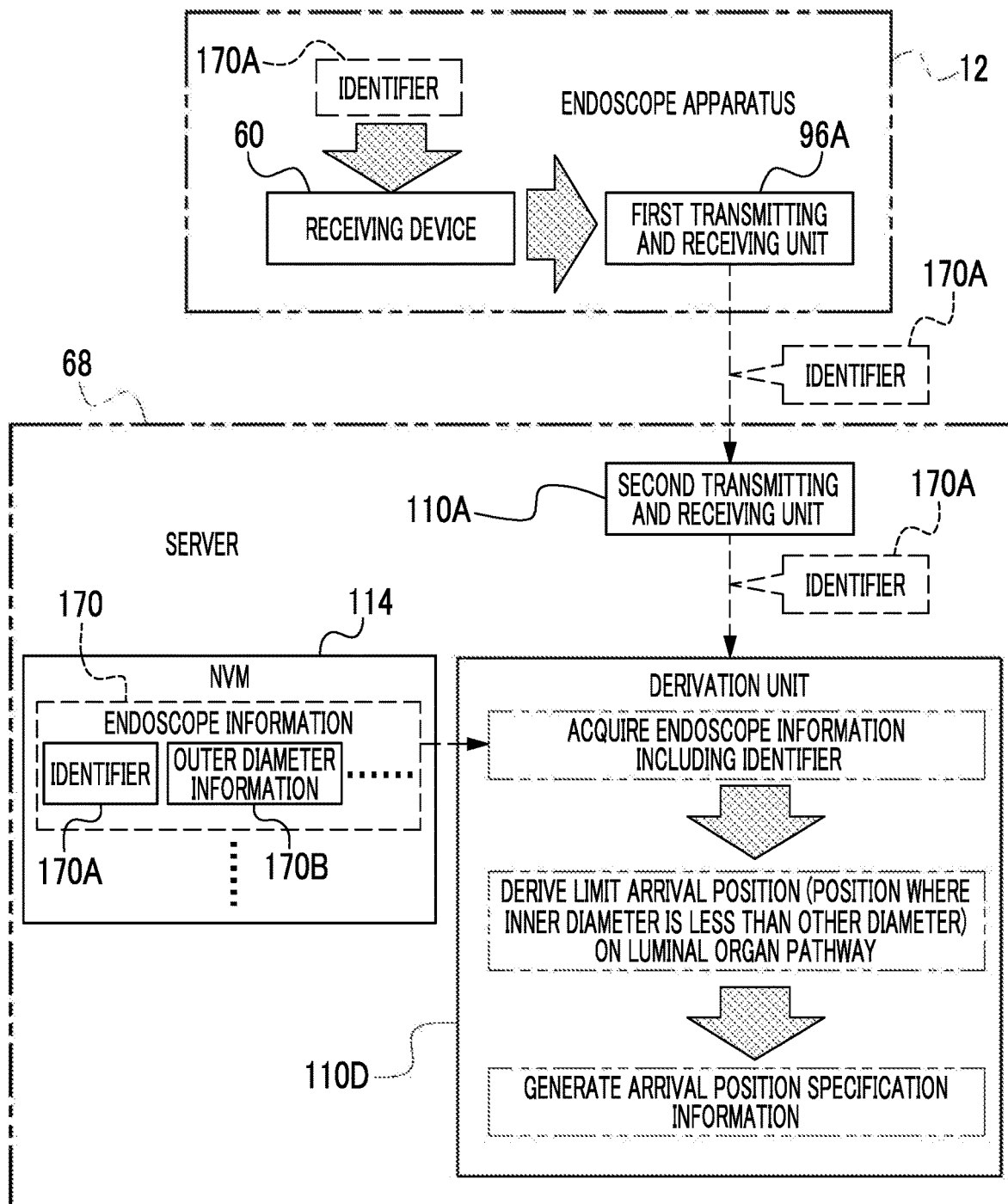
FIG. 23 is a conceptual diagram illustrating an example of content of a process of a derivation unit in a server according to a fourth modification example.

In this case, for example, as illustrated in FIG. 23, in the endoscope apparatus 12, the receiving device 60 receives the identifier 170A. The identifier 170A received by the receiving device 60 is transmitted to the server 68 by the first transmitting and receiving unit 96A. In the server 68, the second transmitting and receiving unit 110A receives the identifier 170A transmitted by the first transmitting and receiving unit 96A. The derivation unit 110D acquires the endoscope information 170 including the same identifier 170A as the identifier 170A received by the second transmitting and receiving unit 110A from the NVM 114 and extracts the outer diameter information 170B from the acquired endoscope information 170. The derivation unit 110D derives the limit arrival position 132A2 on the luminal organ pathway 132A on the basis of the outer diameter α indicated by the outer diameter information 170B and a plurality of inner diameters β acquired in the same manner as in the above-described embodiment. Then, the derivation unit 110D generates the arrival position specification information 162 for each luminal organ pathway 132A on the basis of the limit arrival position 132A2 in the same manner as in the above-described embodiment.

As described above, in a case in which a plurality of bronchoscopes 18 are present, the limit arrival position 132A2 is derived for the bronchoscope 18 selected from the plurality of bronchoscopes 18 according to the instruction received by the receiving device 60. Therefore, it is possible to support the operation of inserting the bronchoscope 18 (for example, the insertion portion 34) intended by the user to reach a predetermined position 90 (for example, a position determined on the basis of the limit arrival position 132A2) in the bronchus 86.

Fifth Modification Example

Figure 24:
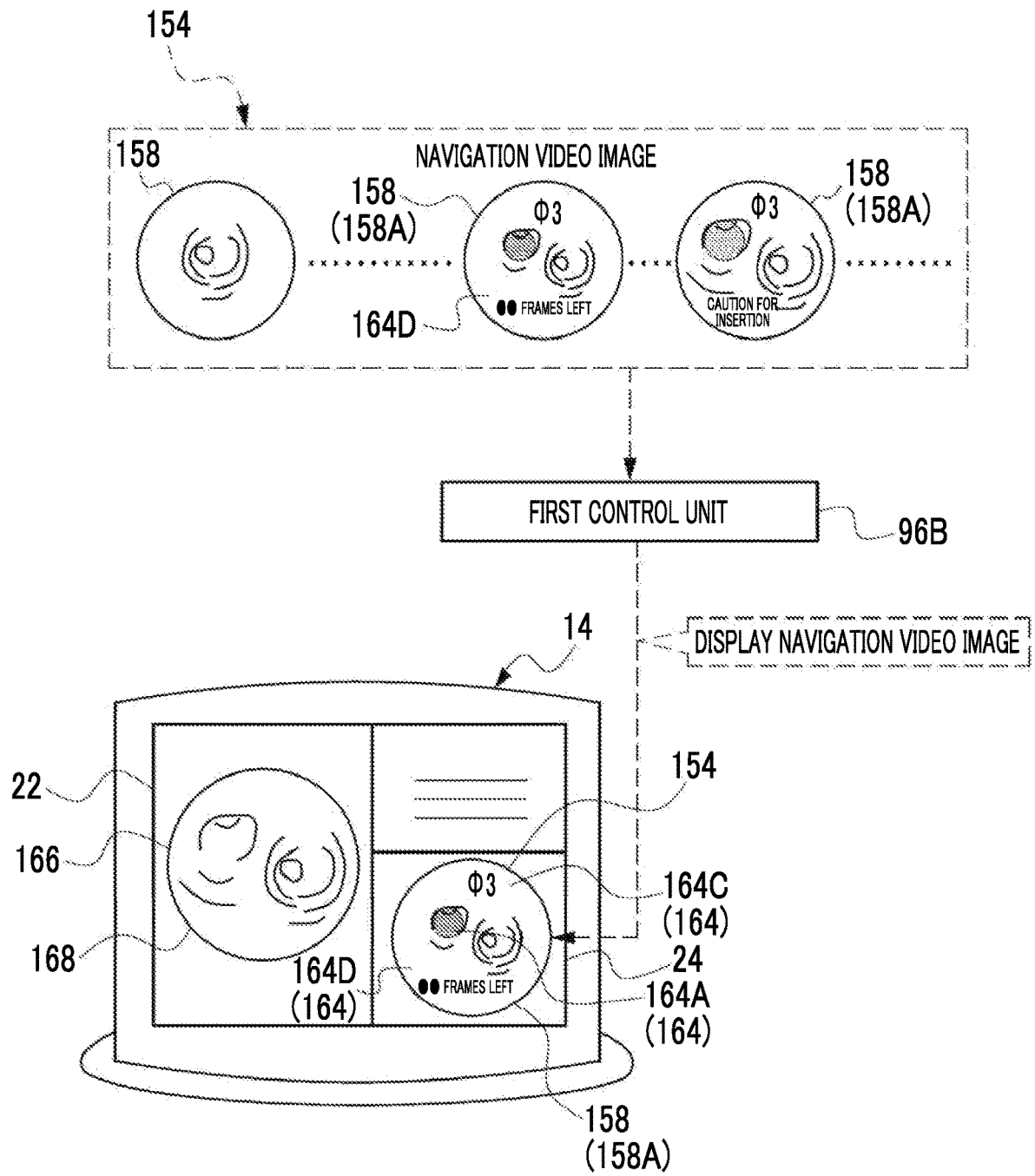
FIG. 24 is a conceptual diagram illustrating an example of a navigation video image according to a fifth modification example.

In the above-described embodiment, the aspect in which the alert message 164B (see FIG. 16) is included in the limit arrival-related information 164 has been described. However, the technology of the present disclosure is not limited to this aspect. For example, as illustrated in FIG. 24, in a case in which the frame 158 indicating the aspect of the designated position in the bronchus 86 is displayed, an alert message 164D may be displayed as one of the information items included in the limit arrival-related information 164 on the second screen 24. The frame 158 indicating the aspect of the designated position in the bronchus 86 means, for example, a frame 158 that is a predetermined number of frames before the frame 158 corresponding to the limit arrival position 132A2.

The alert message 164D is a message alerting that the frame 158 indicates the aspect of the designated position in the bronchus 86. An example of the alert message 164D is a message indicating a relationship between the frame 158 displayed on the second screen 24 and the frame 158 corresponding to the limit arrival position 132A2. In the example illustrated in FIG. 24, a message indicating the number of frames from the frame 158 displayed on the second screen 24 to the frame 158 corresponding to the limit arrival position 132A2 is illustrated as an example of the alert message 164D. The message indicating the number of remaining frames is only an example and may be, for example, a message including a numerical value such as the time required for displaying the frame 158 corresponding to the limit arrival position 132A2 and/or the distance to the limit arrival position 132A2 in a real space. The message is only an example and may be expressed by, for example, a numerical value, a mark, and/or a voice. The alert message 164D is an example of "second alert information" and "relationship information" according to the technology of the present disclosure.

In a case in which the frame 158 indicating the aspect of the designated position in the bronchus 86 is displayed in this way, the alert message 164D is displayed as one of the information items included in the limit arrival-related information 164 on the second screen 24. Therefore, it is possible to make the user perceive that the bronchoscope 18 has reached the designated position (for example, the position 90 illustrated in FIG. 3) in the bronchus 86. In addition, it is possible to make the user perceive the relationship between the frame 158 displayed on the second screen 24 and the frame 158 corresponding to the limit arrival position 132A2.

Sixth Modification Example

Figure 25:
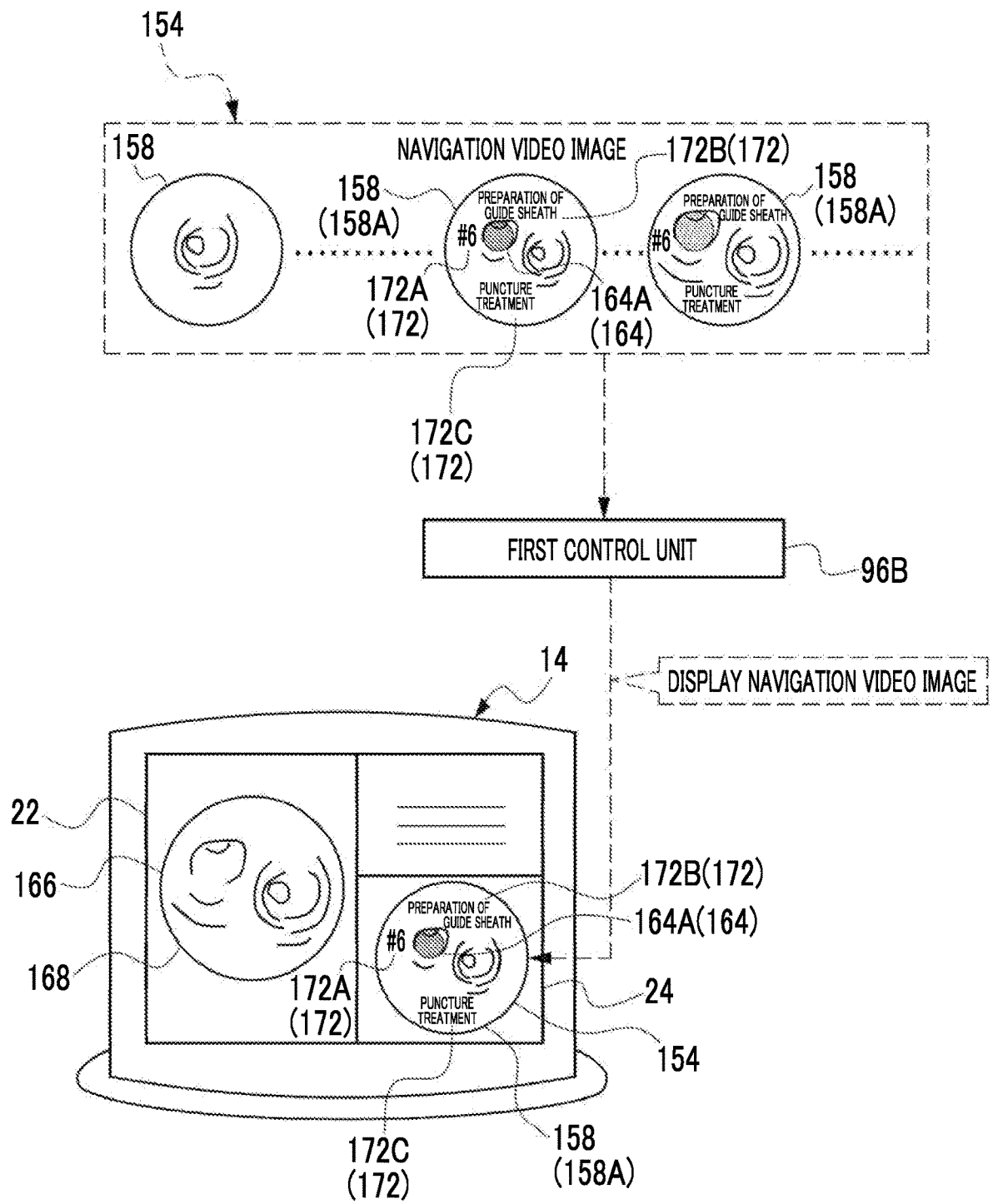
FIG. 25 is a conceptual diagram illustrating an example of a navigation video image according to a sixth modification example.

In the above-described embodiment, the aspect in which the colored mark 164A, the alert message 164B, and the numerical value 164C are superimposed on the frame 158 has been described. However, the technology of the present disclosure is not limited to this aspect. For example, as illustrated in FIG. 25, as the information included in the limit arrival-related information 164, support information 172 may be superimposed on the frame 158.

The support information 172 is information that supports the operation of the bronchoscope 18 at the limit arrival position 132A2. The support information 172 includes information that can specify the position of a part having the inner diameter β of the limit arrival position 132A2, information indicating precautions in the part having the inner diameter β of the limit arrival position 132A2, and information indicating a treatment method using the bronchoscope 18. In the example illustrated in FIG. 25, a branch identifier 172A (in the example illustrated in FIG. 25, an identifier "#6") is illustrated as an example of the information that can specify the position of the part having the inner diameter β of the limit arrival position 132A2. The branch identifier 172A is an identifier that can specify a branch in the virtual luminal organ 130A. In addition, in the example illustrated in FIG. 25, a message 172B that prompts the preparation of the guide sheath 50A (see FIG. 2) is illustrated as an example of the information indicating the precautions in the part having the inner diameter β of the limit arrival position 132A2. Further, in the example illustrated in FIG. 25, a message 172C that prompts a treatment using the puncture needle 50B is illustrated as an example of the information indicating the treatment method using the bronchoscope 18.

As described above, the support information 172 is superimposed as the information included in the limit arrival-related information 164 on the frame 158, which makes it possible to achieve a smooth operation of the bronchoscope 18 at a stage where the bronchoscope 18 reaches a predetermined position in the bronchus 86 (for example, a position determined on the basis of the limit arrival position 132A2).

In addition, the support information 172 may not be displayed according to the instruction received by the receiving device 60, or the display and non-display of the support information 172 may be switched according to the instruction received by the receiving device 60. The branch identifier 172A, the message 172B, and the message 172C may be selectively displayed or may not be selectively displayed according to the instruction received by the receiving device 60.

Other Modification Examples

In the above-described embodiment, the aspect in which the limit arrival position 132A2 is derived by the derivation unit 110D has been described. However, the technology of the present disclosure is not limited to this aspect. For example, the derivation unit 110D may be configured to derive a designated position (for example, a position determined on the basis of the limit arrival position 132A2) on the upstream side of the limit arrival position 132A2 on the luminal organ pathway 132A. In this case, the designated position on the upstream side of the limit arrival position 132A2 on the luminal organ pathway 132A is an example of an "arrival position" according to the technology of the present disclosure.

In the above-described embodiment, the aspect in which the navigation video image display process is performed by the endoscope processing device 56 has been described. However, the technology of the present disclosure is not limited to this aspect. For example, the device that performs the navigation video image display process may be provided outside the endoscope processing device 56. An example of the device provided outside the endoscope processing device 56 is the server 68. For example, the server 68 is implemented by cloud computing. Here, cloud computing is given as an example. However, this is only an example. For example, the server 68 may be implemented by a mainframe or may be implemented by network computing such as fog computing, edge computing, or grid computing. Here, the server 68 is given as an example of the device provided outside the endoscope processing device 56. However, this is only an example. For example, at least one personal computer may be used instead of the server 68. In addition, the navigation video image display process may be dispersively performed by a plurality of devices including the endoscope processing device 56 and the device provided outside the endoscope processing device 56.

In the above-described embodiment, the aspect in which the endoscope processing device 56 performs the navigation video image display process and the endoscope image display process has been described. However, the technology of the present disclosure is not limited to this aspect. Of the navigation video image display process and the endoscope image display process, at least the navigation video image display process may be performed by, for example, a tablet terminal or a PC connected to the endoscope processing device 56 or to the server 68.

Figure 26:
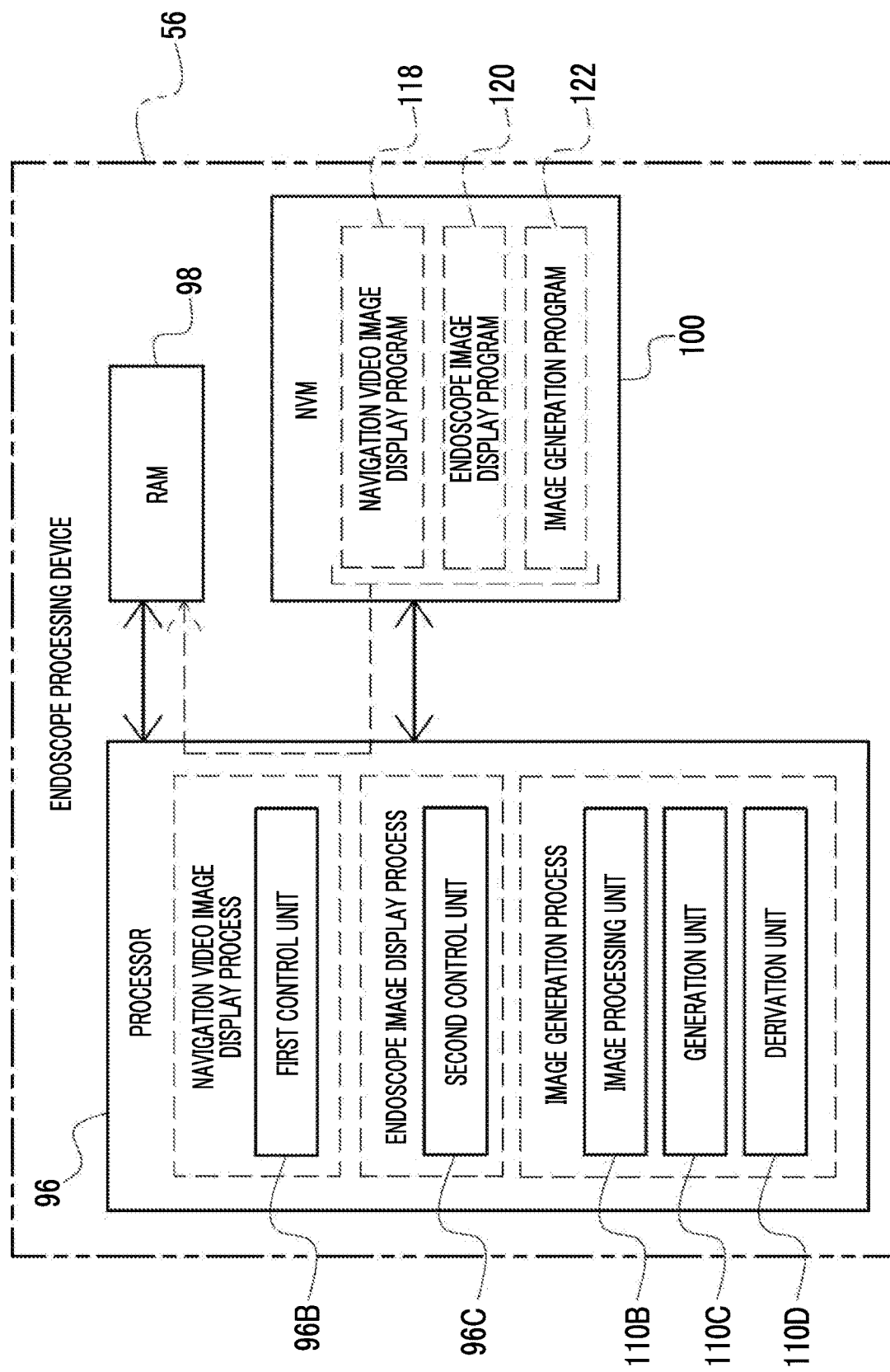
FIG. 26 is a block diagram illustrating a modification example of the functions of the main units of the processor of the endoscope processing device.

In the above-described embodiment, the aspect in which the navigation video image display process and the endoscope image display process are performed by the processor 96 of the endoscope processing device 56 and the image generation process is performed by the processor 110 of the server 68 has been described. However, the technology of the present disclosure is not limited to this aspect. For example, as illustrated in FIG. 26, the processor 96 of the endoscope processing device 56 may perform the navigation video image display process, the endoscope image display process, and the image generation process. In this case, the communication between the endoscope processing device 56 and the server 68 is unnecessary. Therefore, the first transmitting and receiving unit 96A and the second transmitting and receiving unit 110A are also unnecessary.

In addition, the navigation video image display process and the image generation process may be performed by, for example, an in-hospital PC or a tablet terminal that is used by the user to prepare the content of the treatment at a stage before the treatment using the bronchoscope 18 is performed.

In the above-described embodiment, the aspect in which the first screen 22, the second screen 24, and the third screen 26 are displayed on the display device 14 has been described. However, the first screen 22, the second screen 24, and the third screen 26 may be dispersively displayed by different display devices. In addition, the size of the first screen 22, the size of the second screen 24, and the size of the third screen 26 may be selectively changed.

In the above-described embodiment, the aspect in which the first control unit 96B outputs the navigation video image 154 to the display device 14 has been described. However, the technology of the present disclosure is not limited to this aspect. The output destination of the navigation video image 154, the plurality of composite images 158A included in the navigation video image 154, and/or the limit arrival-related information 164 may be a storage medium (for example, the NVM 114 and/or an external storage). In addition, the limit arrival-related information 164 may be output by voice through a speaker.

In the above-described embodiment, the aspect in which the navigation video image display program 118 is stored in the NVM 100 and the image generation program 122 is stored in the NVM 114 has been described. However, the technology of the present disclosure is not limited to this aspect. For example, the navigation video image display program 118 and the image generation program 122 (hereinafter, referred to as "programs") may be stored in a portable storage medium such as an SSD or a USB memory. The storage medium is a non-transitory computer-readable storage medium. The program stored in the storage medium is installed in the computer 70 and/or the computer 92. The processor 96 and/or the processor 110 executes the navigation video image display process and the image generation process (hereinafter, referred to as "various processes") according to the programs.

In the above-described embodiment, the computer 70 and/or the computer 92 is given as an example. However, the technology of the present disclosure is not limited thereto, and a device including an ASIC, an FPGA, and/or a PLD may be applied instead of the computer 70 and/or the computer 92. In addition, a combination of a hardware configuration and a software configuration may be used instead of the computer 70 and/or the computer 92.

The following various processors can be used as hardware resources for performing various processes described in the above-described embodiment. An example of the processor is a processor which is a general-purpose processor that executes software, that is, a program, to function as the hardware resources performing various processes. In addition, an example of the processor is a dedicated electronic circuit which is a processor having a dedicated circuit configuration designed to perform a specific process, such as an FPGA, a PLD, or an ASIC. Any processor has a memory built in or connected to it, and any processor uses the memory to perform various processes.

The hardware resource for performing various processes may be configured by one of the various processors or by a combination of two or more processors of the same type or different types (for example, a combination of a plurality of FPGAs or a combination of a processor and an FPGA). Further, the hardware resource for performing various processes may be one processor.

A first example of the configuration in which the hardware resource is configured by one processor is an aspect in which one processor is configured by a combination of one or more processors and software and functions as the hardware resource for performing various processes. A second example of the configuration is an aspect in which a processor that implements the functions of the entire system including a plurality of hardware resources for performing various processes using one IC chip is used. A representative example of this aspect is an SoC. As described above, various processes are achieved using one or more of the various processors as the hardware resource.

In addition, specifically, an electronic circuit obtained by combining circuit elements, such as semiconductor elements, can be used as the hardware structure of the various processors. Further, the various processes are only an example. Therefore, it goes without saying that unnecessary steps may be deleted, new steps may be added, or the processing order may be changed, without departing from the gist.

The content described and illustrated above is a detailed description of portions related to the technology of the present disclosure and is only an example of the technology of the present disclosure. For example, the description of the configurations, functions, operations, and effects is the description of examples of the configurations, functions, operations, and effects of the portions related to the technology of the present disclosure. Therefore, it goes without saying that unnecessary portions may be deleted or new elements may be added or replaced in the content described and illustrated above, without departing from the gist of the technology of the present disclosure. In addition, the description of, for example, common technical knowledge that does not need to be particularly described to enable the implementation of the technology of the present disclosure is omitted in the content described and illustrated above in order to avoid confusion and to facilitate the understanding of the portions related to the technology of the present disclosure.

In the specification, "A and/or B" is synonymous with "at least one of A or B". That is, "A and/or B" means only A, only B, or a combination of A and B. Further, in the specification, the same concept as "A and/or B" is applied to a case in which the connection of three or more matters is expressed by "and/or".

All of the documents, the patent applications, and the technical standards described in the specification are incorporated by reference herein to the same extent as each individual document, each patent application, and each technical standard is specifically and individually stated to be incorporated by reference.

What is claimed is:

1. An information processing apparatus comprising:
   a processor,
   wherein the processor is configured to:
   derive an inner diameter of a bronchus on the basis of volume data including a bronchial image showing the bronchus,
   derive an arrival position of a bronchoscope that is inserted into the bronchus on the basis of the inner diameter and an outer diameter of the bronchoscope,
   output arrival position-related information related to the arrival position, and
   display a navigation video image, which is generated on the basis of the volume data and shows an aspect of advancing in the bronchus along a tube, and an actual video image obtained by imaging the inside of the bronchus with the bronchoscope, on a display device so as to enable comparison thereof, the navigation video image including a predetermined number of composite images, wherein:
   the predetermined number of composite images are generated by superimposing the arrival-position-related information onto each of a predetermined number of images, and
   the predetermined number of images are images obtained within a period extending backward by the predetermined number of images, including an image corresponding to the arrival position specified from the arrival-position-related information.

2. The information processing apparatus according to claim 1,
   wherein the arrival position is a limit position that the bronchoscope is capable of reaching in the bronchus.

3. The information processing apparatus according to claim 2,
   wherein the limit position is a position where the inner diameter is less than the outer diameter, a position where a diameter determined on the basis of the inner diameter is less than the outer diameter, a position where the inner diameter is less than a diameter determined on the basis of the outer diameter, or a position where the diameter determined on the basis of the inner diameter is less than the diameter determined on the basis of the outer diameter.

4. The information processing apparatus according to claim 1,
   wherein the arrival position is a position on a shortest pathway to a designated target position in the bronchus.

5. The information processing apparatus according to claim 4,
   wherein a plurality of target positions are present, and the arrival position is derived for each of the plurality of target positions.

6. The information processing apparatus according to claim 4, wherein the target position is determined according to an instruction received by a receiving device.

7. The information processing apparatus according to claim 4,
wherein the processor derives a plurality of target position candidates on the basis of the volume data, and
the target position is at least one target position candidate selected from the plurality of target position candidates according to an instruction received by a receiving device.

8. The information processing apparatus according to claim 1,
wherein a plurality of the bronchoscopes are present, and the arrival position is derived for each of the bronchoscopes.

9. The information processing apparatus according to claim 1,
wherein a plurality of the bronchoscopes are present, and the outer diameter is an outer diameter of a bronchoscope selected from the plurality of bronchoscopes according to an instruction received by a receiving device.

10. The information processing apparatus according to claim 1,
wherein the output of the arrival position-related information is display of the arrival position-related information on a display device.

11. The information processing apparatus according to claim 1,
wherein the arrival position-related information includes first alert information for calling attention, and
the processor outputs the first alert information in a case in which a virtual endoscope corresponding to the bronchoscope reaches the arrival position and/or a position determined on the basis of the arrival position.

12. The information processing apparatus according to claim 1,
wherein the video image includes a plurality of images, and
in a case in which an image showing an aspect of a designated position in the bronchus among the plurality of images is displayed on the display device, the processor displays the arrival position-related information on the display device.

13. The information processing apparatus according to claim 12,
wherein the designated position in the bronchus is a position selected according to an instruction received by a receiving device or a position determined on the basis of the arrival position.

14. The information processing apparatus according to claim 1,
wherein the video image includes a plurality of images, the arrival position-related information includes second alert information for calling attention, and
in a case in which an image showing an aspect of a designated position in the bronchus among the plurality of images is displayed on the display device, the processor displays the second alert information on the display device.

15. The information processing apparatus according to claim 1,
wherein the video image includes a plurality of images, the arrival position-related information includes relationship information indicating a relationship between an image displayed on the display device among the plurality of images and an image showing an aspect of the arrival position, and the processor displays the relationship information corresponding to display content of the video image on the display device.

16. The information processing apparatus according to claim 1,
wherein the arrival position-related information includes support information that supports an operation of the bronchoscope at the arrival position.

17. The information processing apparatus according to claim 16,
wherein the support information includes information that is capable of specifying a position of a part having the inner diameter, information indicating precautions in the part, and/or information indicating a treatment method using the bronchoscope.

18. The information processing apparatus according to claim 1,
wherein the outer diameter is an outer diameter of an insertion portion of the bronchoscope.

19. A bronchoscope apparatus comprising:
the information processing apparatus according to claim 1; and
the bronchoscope.

20. An information processing method comprising:
deriving an inner diameter of a bronchus on the basis of volume data including a bronchial image showing the bronchus;
deriving an arrival position of a bronchoscope that is inserted into the bronchus on the basis of the inner diameter and an outer diameter of the bronchoscope;
outputting arrival position-related information related to the arrival position; and
displaying a navigation video image, which is generated on the basis of the volume data and shows an aspect of advancing in the bronchus along a tube, and an actual video image obtained by imaging the inside of the bronchus with the bronchoscope, on a display device so as to enable comparison thereof, the navigation video image including a predetermined number of composite images, wherein:
the predetermined number of composite images are generated by superimposing the arrival-position-related information onto each of a predetermined number of images, and
the predetermined number of images are images obtained within a period extending backward by the predetermined number of images, including an image corresponding to the arrival position specified from the arrival-position-related information.

21. A non-transitory computer-readable storage medium storing a program executable by a computer to perform a process comprising:
deriving an inner diameter of a bronchus on the basis of volume data including a bronchial image showing the bronchus;
deriving an arrival position of a bronchoscope that is inserted into the bronchus on the basis of the inner diameter and an outer diameter of the bronchoscope;
outputting arrival position-related information related to the arrival position; and
displaying a navigation video image, which is generated on the basis of the volume data and shows an aspect of advancing in the bronchus along a tube, and an actual video image obtained by imaging the inside of the bronchus with the bronchoscope, on a display device so as to enable comparison thereof, the navigation video image including a predetermined number of composite images, wherein:

the predetermined number of composite images are generated by superimposing the arrival-position-related information onto each of a predetermined number of images, and the predetermined number of images are images obtained within a period extending backward by the predetermined number of images, including an image corresponding to the arrival position specified from the arrival-position-related information.

\* \* \* \* \*